United States Patent [19]

Noguchi et al.

[11] Patent Number: 4,617,599

[45] Date of Patent: Oct. 14, 1986

[54] PCM SIGNAL RECORDING/REPRODUCING APPARATUS

[75] Inventors: Takaharu Noguchi; Masaharu Kobayashi; Takao Arai; Toshifumi Shibuya, all of Yokohama, Japan

[73] Assignee: Hitachi, Ltd., Tokyo, Japan

[21] Appl. No.: 620,893

[22] Filed: Jun. 15, 1984

[30] Foreign Application Priority Data

Jun. 15, 1983 [JP] Japan .............................. 58-105880
Jun. 15, 1983 [JP] Japan .............................. 58-105882
Jun. 17, 1983 [JP] Japan .............................. 58-107699
Sep. 14, 1983 [JP] Japan .............................. 58-168154

[51] Int. Cl.$^4$ .......................... G11B 5/00; G11B 5/09
[52] U.S. Cl. ........................................ 360/32; 360/51
[58] Field of Search .............................. 360/32, 51, 73

[56] References Cited

U.S. PATENT DOCUMENTS 4,348,699  9/1982  Tsuchiya et al. ...................... 360/32
4,371,901  2/1983  Shah ..................................... 360/65
4,382,268  5/1983  Frimer ................................. 360/73
4,404,602  9/1983  Hoshimi et al. ...................... 360/32

Primary Examiner—Vincent P. Canney
Attorney, Agent, or Firm—Antonelli, Terry & Wands

[57] ABSTRACT

A digital signal recording/reproducing apparatus capable of recording and reproducing digital signals having differences in respect to sampling frequency thereof and the number of quantization bits per sample by means of a common circuit arrangement includes means for varying revolution speed of rotating heads for recording and reproduction or traveling speed of a recording medium as a function of different sampling frequencies. A signal processing circuit for processing the digital signals so as to be suited for the recording on the recording medium is controlled by a clock signal of which frequency is changed in dependence on the different sampling frequencies. The signal processing circuit is arranged so that PCM data contained in a frame is constituted by a number of bits which is equal to a common multiple of the different quantization bit numbers and added with a common frame synchronizing signal and common error detection and correction codes to thereby prepare the PCM signal of the frame arrangement. The digital signals which differ in the sampling frequency and the quantization bit numbers can be recorded by same recording and reproducing apparatus with an improved efficiency with a same wavelength and in a same signal format.

10 Claims, 26 Drawing Figures

FIG. 9

| ADDRESS | BLOCK A | BLOCK B | BLOCK C |
|---|---|---|---|
| 0 | C: CONTROL DATA | C | C |
| 1 | $W_0$: SAMPLE 1 8 MSB | $W_0$ | $W_0$ |
| 2 | $W_1$: SAMPLE 1 8 LSB | $W_1$ | $W_1$ |
| 3 | $W_2$: SAMPLE 2 8 MSB | $W_2$ | $W_2$ |
| 4 | $W_3$: SAMPLE 2 8 LSB | $W_3$ | $W_3$ |
| 5 | $W_4$: SAMPLE 3 8 MSB | $W_4$ | $W_4$ |
| 6 | $W_5$: SAMPLE 3 8 LSB | $W_5$ | $W_5$ |
| 7 | $W_6$: SAMPLE 4 8 MSB | $W_6$ | $W_6$ |
| 8 | $W_7$: SAMPLE 4 8 LSB | $W_7$ | $W_7$ |
| 9 | $W_8$: SAMPLE 5 8 MSB | $W_8$ | $W_8$ |
| 10 | $W_9$: SAMPLE 5 8 LSB | $W_9$ | $W_9$ |
| 11 | $W_{10}$: SAMPLE 6 8 MSB | $W_{10}$ | $W_{10}$ |
| 12 | $W_{11}$: SAMPLE 6 8 LSB | $W_{11}$ | $W_{11}$ |
| 13 | | $P_0$ | $P_0$ |
| 14 | | $P_1$ | $P_1$ |
| 15 | | $P_2$ | $P_2$ |
| 16 | | $P_3$ | $P_3$ |

FIG. 11

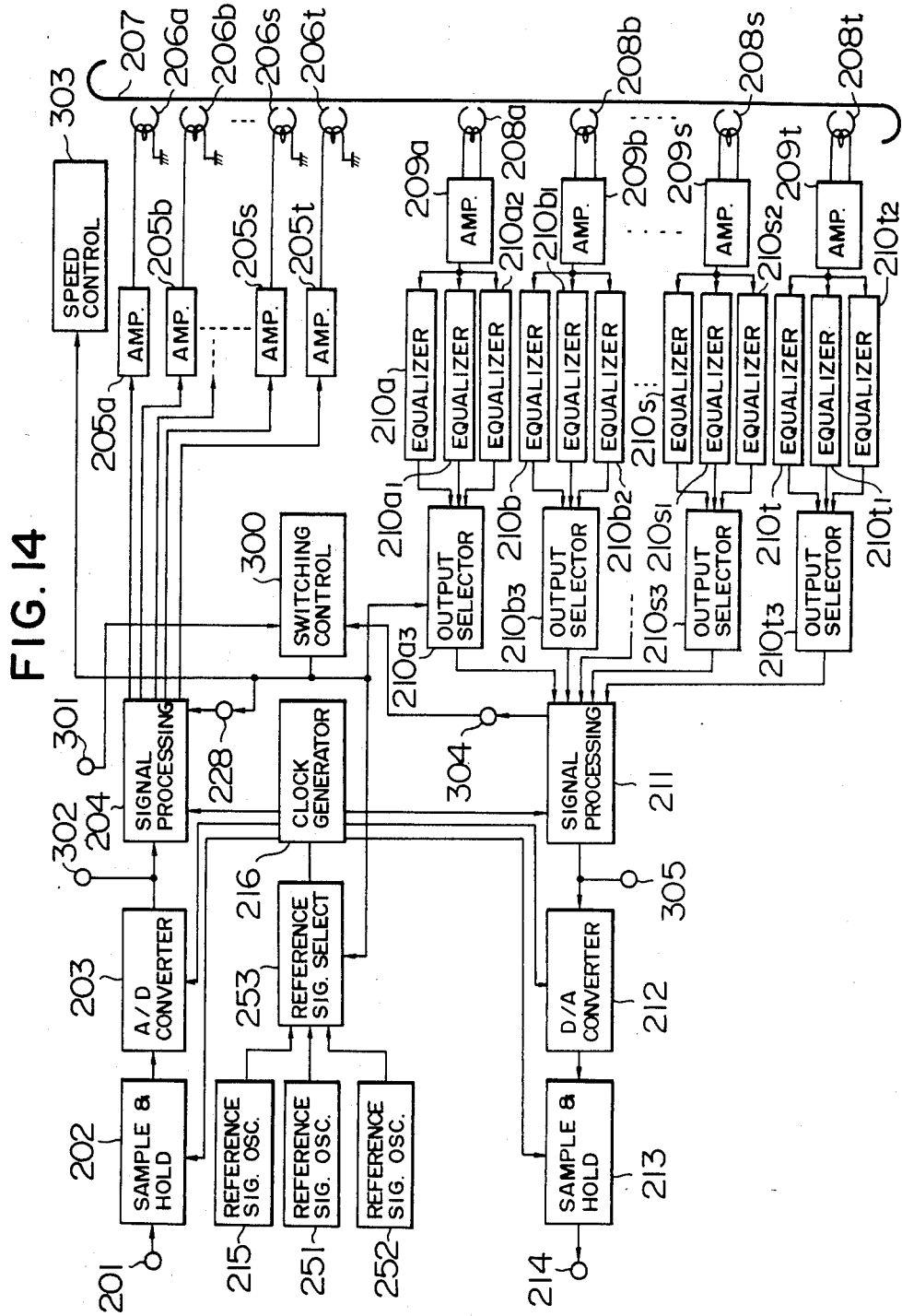

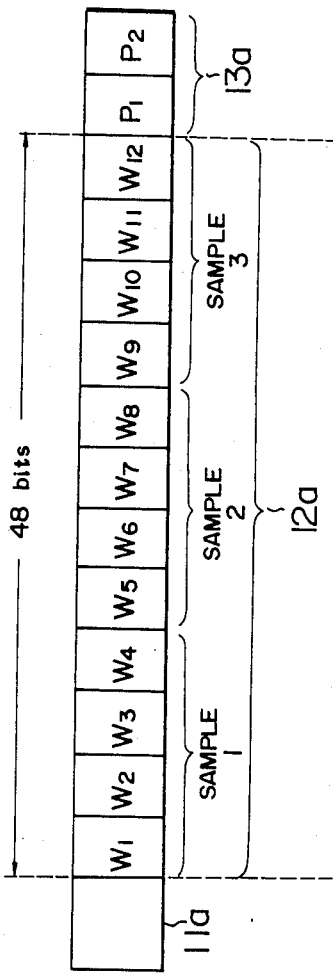
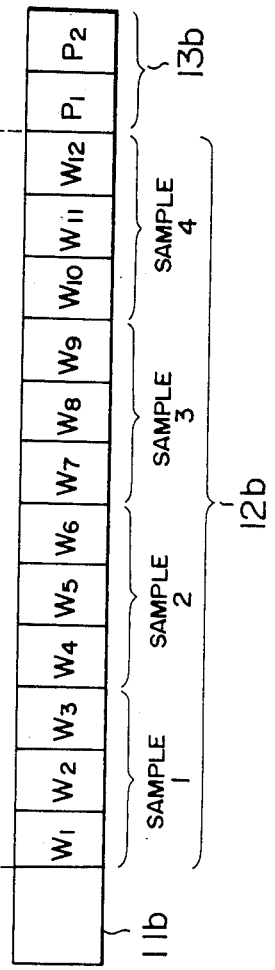

FIG. 18

307 — 96 bits

| | | 1 | 2 | 3 | 4 | 5 | 6 | 7 | 8 | 9 | 10 | 11 | 12 | |
|---|---|---|---|---|---|---|---|---|---|---|---|---|---|---|
| t1 | 11a1 | W(1,1) | W(1,2) | W(1,3) | W(1,4) | W(1,5) | W(1,6) | W(1,7) | W(1,8) | W(1,9) | W(1,10) | W(1,11) | W(1,12) | 13a1 |
| t2 | 11a2 | W(2,1) | W(2,2) | | | | | | | | | | | 13a2 |
| t3 | 11a3 | W(3,1) | | W(3,3) | | | | | | | | | | 13a3 |
| t4 | 11a4 | W(4,1) | | | W(4,4) | | | | | | | | | 13a4 |
| t5 | 11a5 | W(5,1) | | | | W(5,5) | | | | | | | | 13a5 |
| t6 | 11a6 | W(6,1) | | | | | W(6,6) | | | | | | | 13a6 |
| t7 | 11a7 | W(7,1) | | | | | | W(7,7) | | | | | | 13a7 |
| t8 | 11a8 | W(8,1) | | | | | | | W(8,8) | | | | | 13a8 |
| t9 | 11a9 | W(9,1) | | | | | | | | W(9,9) | | | | 13a9 |
| t10 | 11a10 | W(10,1) | | | | | | | | | W(10,10) | | | 13a10 |
| t11 | 11a11 | W(11,1) | | | | | | | | | | W(11,11) | | 13a11 |
| t12 | 11a12 | W(12,1) | | | | | | | | | | | W(12,12) | 13a12 |
| t13 | 11a13 | W(13,1) | | | | | | | | | | | W(13,12) | 13a13 |
| t14 | 11a14 | W(14,1) | | | | | | | | | | | W(14,12) | 13a14 |
| t15 | 11a15 | W(15,1) | | | | | | | | | | | W(15,12) | 13a15 |
| t16 | 11a16 | W(16,1) | | | | | | | | | | | W(16,12) | 13a16 |
| t17 | 11a17 | $P_1(1)$ | | | | | | | | | | | $P_1(12)$ | 13a17 |
| t18 | 11a18 | $P_2(1)$ | | | | | | | | | | | $P_2(12)$ | 13a18 |
| t19 | 11a19 | $P_3(1)$ | | | | | | | | | | | $P_3(12)$ | 13a19 |
| t20 | 11a20 | $P_4(1)$ | | | | | | | | | | | $P_4(12)$ | 13a20 |

PCM SIGNAL RECORDING/REPRODUCING APPARATUS

The present invention in general relates to a recording/reproducing apparatus for recording and/or reproducing a digital signal converted from an audio signal. More particularly, the invention concerns a digital signal recording/reproducing apparatus in which different types of digital signals converted from an audio analogue signal can be recorded on a recording medium in substantially the same format or signal wavelength even when such different types of the digital signals are different in some respects, such as sampling frequency, number of quantization bits and the like.

As an approach to recording and reproducing an audio signal with a high quality, it is conventional practice to convert an audio signal to a digital signal such as a pulse code modulation signal (hereinafter referred to as PCM signal) to be subsequently recorded. At present, in view of the fact that video casette recorders for home use are manufactured on a mass production scale and are commercially available at a low price, there is an increasing tendency that the PCM signal recording/reproducing apparatus of the rotating head type or stationary head type adapted for multi-track recording and reproduction for domestic use are practically developed for the audio applications by making use of the video casette recorder.

The PCM signal recording/reproducing apparatus generally includes a sample and hold circuit for sampling an analogue audio signal by using a clock signal of an appropriate frequency, an analog-to-digital converter (hereinafter referred to simply as A/D converter) for converting the sampled signal to the PCM signal, recording/reproducing means such as a magnetic tape recording/reproducing head assembly, a signal processing circuit of the recording system for processing the PCM signal so that it is suitable for the recording and reproduction, a signal processing circuit of the reproducing system for processing the reproduced signal, a digital-to-analog converter (hereinafter referred to simply as D/A converter) for demodulating or decoding the PCM signal, and a circuit such as a sample and hold circuit for smoothing the waveform of the demodulated signal. As the recording/reproducing means mentioned above, there are employed a rotating head recording/reproducing assembly of the video cassette recorder, a stationary head type recording/reproducing assembly used for multi-track recording, and an exclusive rotating head type recording/reproducing assembly for the audio signal. In dependence on the various types of the recording/reproducing means such as mentioned above, there are proposed and developed a variety of signal formats or standards which are suited for use in the various recording/reproducing means, respectively. Under the circumstances, the sampling frequency at which the analogue signal is converted into the PCM signal as well as the format of the digital signal is not uniformed but varies from one to another type of apparatus now commercially available.

Further, in a so-called CD (compact disc) system in which there is exclusive use of reproduction, a disc-like recording medium recording audio signals converted into PCM signal is employed. Thus, there exist a demand for the recording/reproducing apparatus which is capable of recording in the digital signal form the signal reproduced by the CD system or signal received from a PCM broadcasting which is expected to be practiced in the near future.

Among the audio PCM signals currently proposed or used in practical applications, there are known a PCM signal sampled at a sampling frequency of 44.1 kHz and quantized in 16 bits (e.g. PCM signal of CD system), a PCM signal sampled at 48 KHz and quantized in 16 bits, a PCM signal sampled at 32 KHz and quantized in 14 bits (compressing/expanding), e.g. signal of PCM broadcasting, and others. Needless to say, it is desirable that these PCM signals of different formats or standards could be recorded by the corresponding recording/reproducing apparatus adapted to each format. However, in consideration of the fact that the shortest wavelength capable of being recorded on a recording medium is subjected to limitation imposed by the recording/reproducing means, it is impossible to record the PCM signal of a high sampling frequency with the apparatus which is arranged to match with the PCM signal of lower sampling frequency. Accordingly, by arranging the recording/reproducing apparatus so as to match with the PCM signal of the highest sampling frequency, the PCM signal sampled at a lower sampling frequency can be recorded by using the same recording/reproducing apparatus. However, in that case, there arises a problem that the utilization efficiency of the recording medium is degraded. The utilization efficiency can certainly be improved by converting the sampling frequency through converting of the signal format or standard. However, a large scale circuit is required to this end, providing a difficulty in application to the apparatus for the domestic use.

An object of the present invention is to provide a PCM signal recording/reproducing apparatus which is capable of recording PCM signals of different sampling frequencies in a substantially same recording wavelength or similar format and which allows a recording medium to be used with an improved efficiency.

In view of the above object, it is proposed according to a feature of the invention that a relative speed between a recording head and a recording medium is varied in dependence on the sampling frequency of the PCM signal to be recorded so that the wavelength of the signal as recorded is not changed even when the PCM signals of different sampling frequencies are recorded. For example, in the recording and reproducing apparatus incorporating a rotating head assembly as the recording/reproducing means, the rotation speed of the rotating head assembly and/or the transportation speed of the recording medium may be varied in dependence on the sampling frequency of the PCM signal to be recorded. In the case of the stationary head type recording/reproducing apparatus, the transportation speed of the recording medium may be varied in dependence on the sampling frequency of the PCM signal to be recorded.

According to another aspect of the invention, it is taught that the same frame structure is employed for the PCM signals even when the PCM signals are different in respect to the quantization bit number (i.e. the number of bits in which each sample of the PCM signal is quantized). To this end, the frame is so arranged that the number of the PCM data bits contained in each frame is set equal to a common multiple of the different quantization bit numbers of the PCM signals of different standards, wherein error detection and correction codes are, respectively, created in a predetermined constant number of bits independent of the different quantization bit numbers and added to the arranged PCM data.

Thus, according to the teachings of the present invention, one and the same recording and reproducing apparatus can be used for recording and/or reproducing PCM signals which differ in respect to the sampling frequency and the quantization bit number.

Above and other objects, features and advantages of the invention will be more apparent upon consideration of the following description of preferred embodiments of the invention. The description makes reference to the accompanying drawings, in which:

FIGS. 9 and 10 are views showing memory maps for illustrating operation of the circuit shown in FIG. 8;

FIGS. 11, 12A and 12B are views for illustrating an example of the frame structure for the PCM signal to be processed by a stationary head type recording/reproducing apparatus;

FIG. 14 shows a general arrangement of a stationary head type recording/reproducing apparatus according to another embodiment of the invention;

FIGS. 15A, 15B, 16A, 16B, 17A and 17B show signal arrangements for illustrating preparation of PCM signals of different quantization bit numbers in same frame structures; and FIGS. 18, 19A and 19B are views for illustrating frame structures for PCM signals of different quantization bit numbers to be recorded and reproduced by a stationary multi-head assembly.

Figure 1:
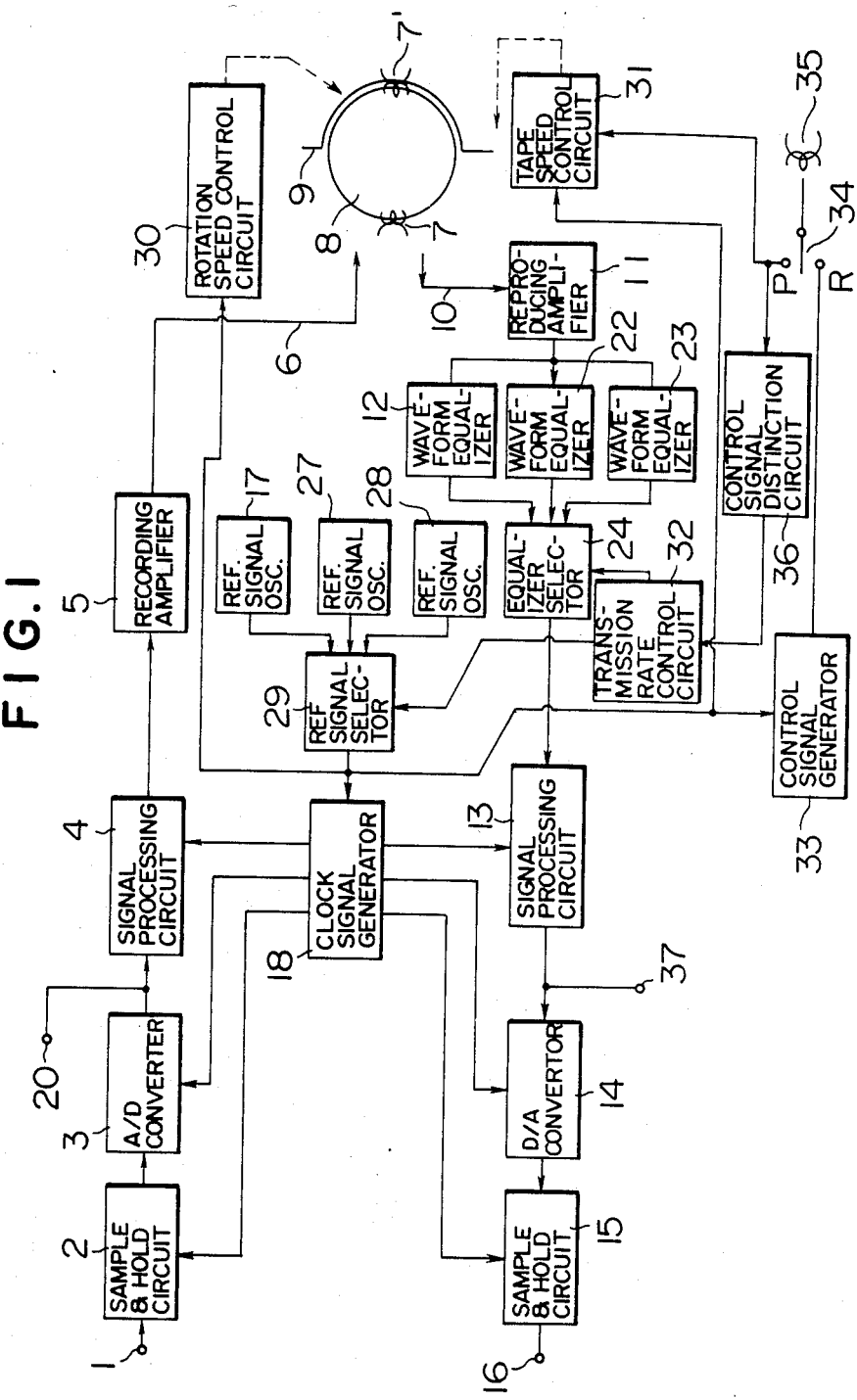
FIG. 1 shows in a block diagram a general arrangement of a rotating head type PCM signal recording/reproducing apparatus to which an embodiment of the invention is applied.

FIG. 1 shows an exemplary embodiment of the rotating head type magnetic recording/reproducing apparatus according to an exemplary embodiment of the invention which is capable of recording PCM signals of the mutually different sampling frequency in substantially same recording format with substantially the same wavelength. This embodiment is designed so as to be capable of recording three varieties of PCM signals of which the sampling frequencies are, respectively, 48 KHz, 44.1 KHz and 32 KHz.

Referring to FIG. 1, an analogue audio signal applied to an input terminal 1 is supplied to a sample and hold circuit 2 in which the analogue audio signal is sampled at the timing of a clock signal supplied from a clock signal generator circuit 18. The audio signal sample is converted into a PCM signal which is a digital signal through an analog-to-digital or A/D converter 3. The PCM signal is then supplied to a signal processing circuit 4 of the recording system where the PCM signal is submitted to error detection and then an error correction code is added along with synchronizing signal to be thereby arranged in the form suited for the recording. The output signal from the signal processing circuit 4 is supplied through a recording amplifier 5 to a rotating magnetic head assembly 8 having, for example, a pair of magnetic heads 7 and 7' for recording the output signal on a recording medium 9 such as a magnetic tape. The terminal 20 is provided for inputting an audio signal in digital form, for example, for dubbing use. The arrangement for converting the analogue audio signal to the PCM signal for the recording in this way can be implemented in principle by resorting to means known per se. A characteristic feature of the exemplary embodiment being now described resides in that three reference signal oscillators 17, 27 and 28 for generating three signals of mutually different frequencies are additionally provided together with a reference signal selecting circuit 29 for selecting one of the reference frequency signals to be supplied to the clock signal generator 18 in order to vary the frequency of the clock signal produced by the clock generator 18 in dependence on the selected one of the different sampling frequencies, and that there are additionally provided a rotation speed control circuit 30 for controlling the rotating magnetic head assembly 8 in dependence on the selected sampling frequency and a tape speed control circuit for controlling the transportation speed of the recording medium correspondingly.

The reproducing system of the illustrated recording/reproducing apparatus is realized basically in an arrangement similar to that of the known PCM signal recording/reproducing apparatus. More specifically, the signals read out from the recording medium 9 by means of the magnetic heads 7 and 7' of the rotating magnetic head assembly 8 are amplified to a requisite amplitude by a reproducing amplifier 11 to be supplied to a waveform equalizer where the signal undergoes correction with respect to variations in the transmission characteristics brought about in the recording and reproducing systems. The signal having passed through the waveform equalizer circuit is supplied to a signal processing circuit 13 for reproduction where the error detection and the error correction of the digital signal are carried out in the manner known per se. The output signal from the signal processing circuit 13 is then converted to an analogue signal through a digital-to-analogue or D/A converter 14. The converted signal is subsequently resampled by a sample and hold circuit 15 for smoothing the waveform and thereafter outputting it as the reproduced output signal from an output terminal 16. The terminal 37 corresponds to the terminal 20 and is provided for taking out the non-converted digital signal. A characteristic feature of the reproducing system in the magnetic recording/reproducing apparatus according to the instant embodiment is seen in the arrangement in which three waveform equalizer circuits 12, 22 and 23 are provided in correspondence with the three different sampling frequencies, respectively, together with a waveform equalizer selecting circuit 24 for selecting one of the three equalizers 12, 22 and 23. It is further noted that a transmission rate control circuit 32, a control signal generator circuit 33 and a control signal discrimination circuit 36 are additionally provided.

The oscillation frequencies of the reference signal generator circuits 17, 27 and 28 are so set as to correspond to three varieties of the basic clock signals of mutually different frequencies. The reference signal selecting circuit 29 selects one of these three reference signals, which is applied to the input of the clock generator 18. As a consequence, periods of the various timing signals for the sample and hold circuits 2 and 15, the A/D converter 3, the D/A converter 14, the signal processing circuit 4 of the recording system and the signal processing circuit 13 of the reproducing system are correspondingly changed.

Since each of the clock signals outputted from the clock signal generator circuit 18 is the same as the clock signal produced by the hitherto known clock signal generating means in dependence on the sampling frequency, and because the circuit configuration may be made such that the period of the clock signal can simply be varied, the clock signal generator circuit 18 can be readily implemented on the basis of the hitherto known circuit configuration.

The control signal for controlling the selection effected by the reference signal selecting circuit 29 and the waveform equalizer selecting circuit 24 is produced by the transmission rate control circuit 32. Under the command of this control signal, the reference signal selecting circuit 29 selects one of the oscillation outputs of the three reference signal generator circuits 17, 22 and 28 to be supplied to the clock signal generator circuit 18, while the waveform equalizer selecting circuit 24 selects one of the reproduced signals having passed through the three waveform equalizer circuits 12, 22 and 23, respectively, the selected signal being supplied to the signal processing circuit 13 for reproduction. The control of the transmission rate control circuit 32 may be effected by means of a manually operated switch. Of course, the control may be performed automatically. By way of example, such automatic control may be realized by making use of the result of detection performed by a detection circuit (not shown) for detecting the sampling frequency from the PCM signal applied to a digital signal dubbing input terminal 20 to which a PCM signal is applied in the form of the digital signal to be recorded. Further, since a signal for discriminatively identifying the different signal aspects such as different sampling frequencies is usually added to a control signal which is recorded on the recording medium 9 by a control head 35 in the recording operation mode, the control signal reproduced by the control head 35 in the reproduction or playback mode may be detected for deriving therefrom the control signal for the automatic selection of the reference signal and the waveform-equalized signal as described above.

A control signal generator circuit 33 serves for producing a signal for discriminating differences among the varieties or types of the signals in addition to a signal for controlling the transportation speed of the recording medium in the reproduction mode and is so designed as to generate a signal for controlling the sampling frequency of the information to be recorded on the basis of the clock signal outputted by the reference signal selecting circuit 29. The sampling frequency control signal is recorded as the aforementioned control signal by the control head 35, being supplied thereto through a recording/reproduction mode change-over switch 34. Upon reproduction, the control signal picked-up by the control head 35 is supplied to the input of the control signal discrimination circuit 36 by way of the recording/reproduction mode change-over switch 34. The circuit 36 identifies discriminatively the sampling frequency and the quantization bit number of the recorded information. The output data of the control signal distinction circuit 36 is supplied to the input of the transmission rate control circuit 32.

The rotation speed control circuit 30 for the rotating magnetic head assembly serves to change the number of revolutions of the head assembly 8 in proportion to the sampling frequency of the PCM digital signal to be recorded. In general, when the PCM digital signal is to be recorded on the recording medium, the maximum frequency which can be recorded is determined in dependence on the transmission characteristic which in turn is determined by the recording medium and the recording reproducing heads as employed. Since the transmission characteristic depends on the wavelength of the signal to be recorded, the recording can be effectively accomplished without involving appreciable waste of the recording medium by varying the relative speed between the recording medium and the rotating recording/reproducing head assembly in accordance with the transmission rate (which is proportional to the sampling frequency) of the signal to be recorded. In the recording/reproducing apparatus of the rotation magnetic head type according to the illustrative embodiment of the invention, the relative speed Vh between the recording medium and the recording/reproducing head is in proportion to the revolution number n of a rotating drum of the head assembly, as is given by the following exppresion:

$$Vh = n \times \pi \times \phi \qquad (1)$$

where $\phi$ represents the diameter of the rotating drum.

Accordingly, to perform the effective recording, the revolution speed control circuit 30 may set, for example, a revolution number of 30 rps (revolution per second) for the sampling frequency of 44.1 KHz as a reference, the revolution number of 32.7 rps for the sampling frequency of 48 KHz and the revolution number of 21.8 rps for the sampling frequency of 32 KHz, respectively.

Figure 2:
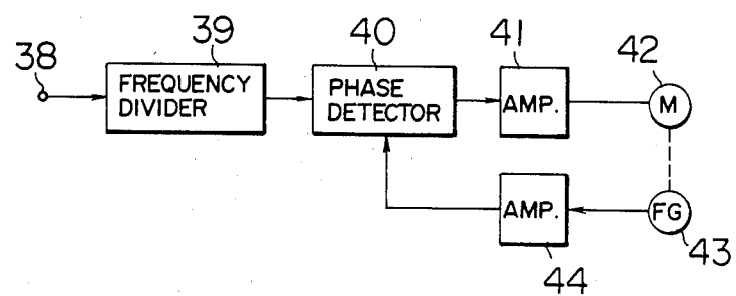
FIG. 2 is a block diagram showing an exemplary arrangement of means for controlling the revolution speed of a rotating head assembly in dependence of the sampling frequency of the PCM signal to be processed.

A circuit arrangement of the revolution speed control circuit 30 is illustrated in FIG. 2, by way of example. In the figure, a reference numeral 38 denotes the output of the reference signal selecting circuit 29, a numeral 39 denotes a frequency divider circuit, 40 denotes a phase comparator, 41 and 44 denote amplifiers, 42 denotes a motor for driving the rotating drum, and 43 denotes a frequency generator (FG) for producing a signal of a frequency which is in proportion to the revolution number of the motor 42. The frequency divider circuit 39 is set at such a frequency division ratio which causes the clock output 38 of the reference signal selecting circuit 29 to drive the rotating head drum at the revolution speed of 30 rps when the sampling frequency is 44.1 KHz. This reference clock signal corresponding to the revolution number of 30 rps is compared through the phase comparator 40 with the output frequency signal of the frequency generator 43 and amplified by the amplifier 44, wherein the output of the phase comparator 40 representative of the result of comparison is utilized in the control of the motor 42 which drives the rotating head drum. In this way, changes in the sampling frequency are followed by the corresponding control or regulation of the revolution number of the motor 42 and hence that of the rotating head drum.

Figure 3:
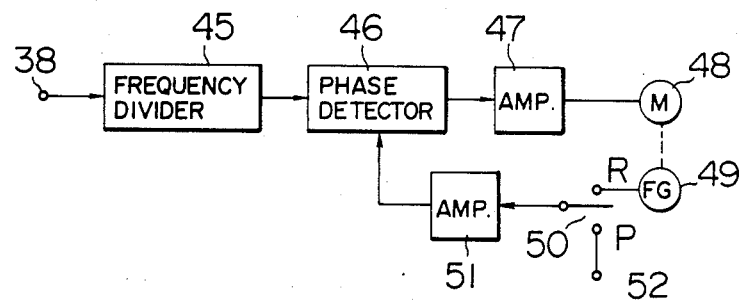
FIG. 3 shows in a block diagram an exemplary arrangement of means for controlling feed speed of a recording medium in dependence on the sampling frequency.

The tape speed control circuit 31 serves for controlling the transportation speed of the recording medium 9 in proportional to the sampling frequency of the PCM digital signal to be recorded. An exemplary circuit arrangement of the tape speed control circuit 31 is illustrated in FIG. 3, in which a reference numeral 45 denotes a frequency divider circuit, 46 denotes a phase comparator, 47 and 51 denote amplifiers, 48 denotes a capstan motor, 49 denotes a frequency generator, 50 denotes the recording/reproduction mode change-over switch, and 52 denotes an input terminal to which the reproduction output of the control head 35 is applied. In the recording mode, the output signal of the frequency divider circuit 45 is compared through the phase comparator 46 with the output signal of the frequency generator 49 amplified by the amplifier 51, as in the case of the revolution number control circuit 30, whereby the signal indicative of the result of comparison outputted by the phase comparator 46 is fed to the capstan motor 48 through the amplifier 47 for controlling the running speed of the recording medium. Upon reproduction, the switch 50 is changed over to the position P. Consequently, the reproduced output signal of the control head 35 applied to a terminal 52 is supplied to the phase comparator 46 through the amplifier 51 as the signal to be compared with the output of the frequency divider circuit 45 in place of the output frequency signal of the frequency generator 49, whereby the tape transportation speed is controlled proportionally to the sampling frequency.

In this connection, it should be mentioned that, in the reproduction mode, initialization of the tape transportation speeds and the revolution numbers of the head assembly corresponding to the three varieties of the sampling frequencies may be made in such a manner in which the reference or center sampling frequency is initially set at 44.1 KHz and then upon detecting of a sampling frequency of the recorded signal, the initial sampling frequency is controlled to be changed over to the detected sampling frequency.

By way of example, in the case of the instant embodiment, the tape transportation speed may be set at 6 mm/second for the sampling frequency of 44.1 KHz, at 6.5 mm/second for the sampling frequency of 48 KHz and at 4.4 mm/second for the sampling frequency of 32 KHz, respectively, so that the width and pitch of the tracks on the recording medium may remain constant.

As described hereinbefore, by varying the revolution number of the rotating head drum and hence the relative speed between the recording medium and recording/reproducing head in proportion to the sampling frequency of the signal to be recorded, the shortest wavelength on the recording medium can always remain constant, resulting in the waveform equalizing characteristic also remaining constant. Although the frequency of the recorded signal may vary in dependence on the different sampling frequencies, such variation can be dealt with merely by shifting correspondingly the waveform equalization characteristic along the frequency base or axis.

Figure 4:
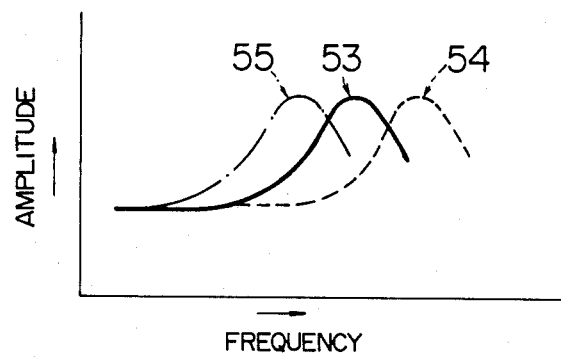
FIG. 4 is a view showing frequency characteristic curves for illustrating, by way of example, characteristics of three waveform equalizer circuits used in the apparatus shown in FIG. 1.

FIG. 4 graphically shows examples of the waveform equalization characteristics required for the waveform equalizer circuits 12, 22 and 23 employed in the recording/reproduction apparatus according to the instant embodiment. In FIG. 4, a curve 53 represents the waveform equalization characteristic for the sampling frequency of 44.1 KHz. A curve 54 represents the waveform equalization characteristic for the sampling frequency of 48 KHz which is obtained by shifting the equalization characteristic curve 53 about 9% toward higher frequency side along the frequency axis. Similarly, a curve 55 represents the waveform equalization characteristic for the sampling frequency of 32 KHz which is obtained by shifting the curve 55 about 27% toward the lower frequency side along the frequency axis. The waveform equalization characteristics represented by the curves 53, 54 and 55 are given to the waveform equalizer circuits 12, 22 and 23 shown in FIG. 1, respectively.

On these conditions, optimum waveform transmission can be realized by changing over these characteristics by means of the waveform equalizer selecting circuit 24 in response to the control signal supplied from the transmission rate control circuit 32.

Figure 5:
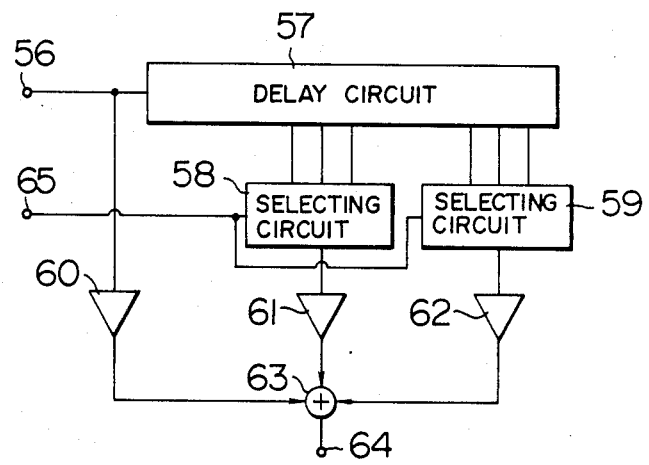
FIG. 5 is a block diagram showing another exemplary embodiment of the waveform equalizer circuit.

FIG. 5 shows, by way of example, another circuit arrangement of the waveform equalizer circuits 12, 22 and 23. The illustrated circuit arrangement is implemented on the basis of the configuration of a transversal filter which is known in the art. In the figure, a numeral 56 denotes an input terminal to which the output signal of the reproducing amplifier 11 (FIG. 1) is applied, 57 denotes a delay circuit, 58 and 59 denote selecting circuits for changing over signals obtained from intermediate taps of the delay circuit 57, numerals 60, 61 and 62 denote amplifiers, 63 denotes an adder, 64 denotes an output terminal, and a numeral 65 denotes a terminal to which the signal from the transmission rate control circuit 32 is applied. With the transversal filter arrangement of the waveform equalizing circuitry, the aforementioned shifting of the waveform equalization characteristics, i.e. the amplitude-versus-frequency characteristics along the frequency axis without being accompanied with changes in the characteristic curve forms can be accomplished by making use of delay amounts which can be produced by the delay circuit 57. More specifically, in response to the control signal supplied from the transmission rate control circuit 32 and corresponding to the existent sampling frequency, the delay amounts produced by the delay circuit 57 are selectively changed by the selecting circuits 58 and 59. The signal applied to the terminal 56 and the output signals of the selecting circuits 58 and 59 are amplified by the amplifiers 60, 61 and 62 and then added together by the adder 63, whereby the waveform equalization characteristics represented by the curves 53, 54 and 55 in FIG. 4 can be realized by the single waveform equalizer circuit shown in FIG. 5.

Further, by taking advantage of the fact that the delay amount is in inverse proportion to the frequency of a driving clock signal in case a CCD (charge-coupled device) is employed as the delay circuit 57, it is possible to change the waveform equalization characteristics in the desired manner merely by varying the frequency of the driving clock signal.

In the foregoing, description has been made on the embodiments that the analogue audio signal is supplied to the analogue input terminal 1 to be recorded. However, above embodiments also can be adapted to the recording of the digital signal which is directly inputted through the digital dubbing terminal 20.

When the format of a signal to be recorded differs in respect to the number of the quantization bits, e.g. a signal of a smaller number of quantization bits, say 14 bits, data of two bits may be inserted in addition to the PCM data of 14 bits, to thereby prepare the format of 16 bits for the recording. In this way, both the signals quantized in 16 bits and 14 bits, respectively, may be recorded and reproduced in a same manner.

However, in case the signal of the 14-bit format is recorded in the manner described above, efficiency is more or less degraded because two insignificant bits are added. In the following, description will be made on an exemplary embodiment of the invention in which arrangement is made such that signals of different formats which differ in respect to the number of the quantization bits can be recorded and reproduced with an improved efficiency without modifying the redundancy. In the description, it is assumed that three varieties of PCM digital signals, i.e. (1) a PCM digital signal sampled at the sampling frequency of 48 KHz and quantized in 16 bits, (2) a PCM digital signal sampled at the sampling frequency of 44.1 KHz and quantized in 16 bits, and (3) a PCM digital signal sampled at the sampling frequency of 32 KHz and quantized in 12 bits are to be recorded and reproduced. At first, a method of preparing a same frame structure for two different PCM digital signals quantized in 16 bits and 12 bits, respectively, as well as a signal processing circuit for carrying out the above method will be described, which is followed by description of a PCM digital recording/reproducing apparatus in which the wavelength and the format of these digital signals recorded on the recording medium can be made constant.

Figure 6A:
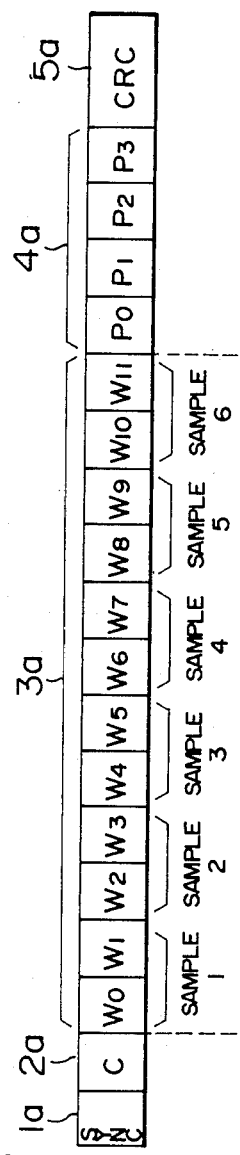
FIGS. 6A, 6B, 7A and 7B are views showing frame structures for illustrating preparation of PCM signals of different quantization bit numbers in a same frame structure or arrangement.
Figure 6B:
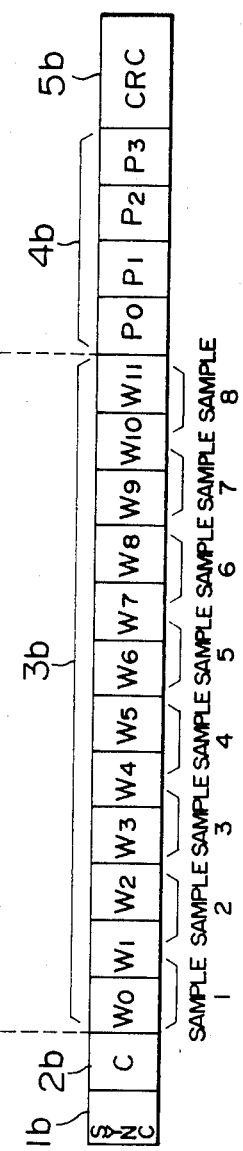

FIGS. 6A and 6B illustrate examples of frames realized in a same frame arrangement or structure for both PCM signals which differ from each other in the number of quantization bits. More particularly, FIG. 6A illustrates an example of a frame structure of a PCM digital signal quantized in 16 bits. Referring to the figure, a reference symbol 1a designates a frame synchronizing signal pattern allotted with 8 bits, 2a designates an area of 8 bits allotted to control data for the control information required by the apparatus in addition to the PCM data, a symbol 3a designates six samples of PCM data each quantized in 16 bits, 4a designates an error correction code of 32 bits, and 5a designates an error detection code of 16 bits. FIG. 6B shows an example of a frame structure for a PCM digital signal quantitized in 12 bits. In FIG. 6B, a reference symbol 1b designates the frame synchronizing signal pattern of 8 bits, a symbol 2b designates the control data of 8 bits, a symbol 3b designates PCM data of eight samples each quantitized in 12 bits, a symbol 4b designate an error correction code of 32 bits, and 5b designate an error detection code of 16 bits.

Figure 7A:
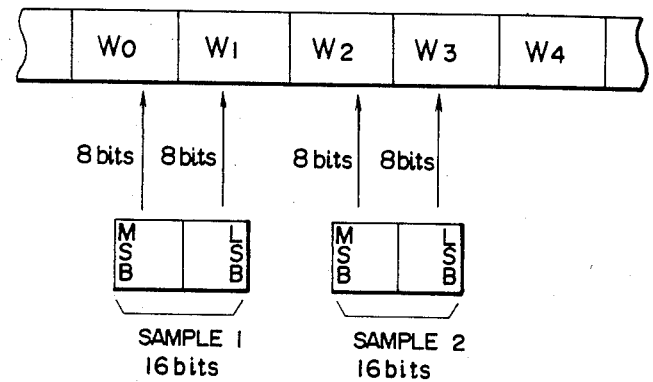
Figure 7B:
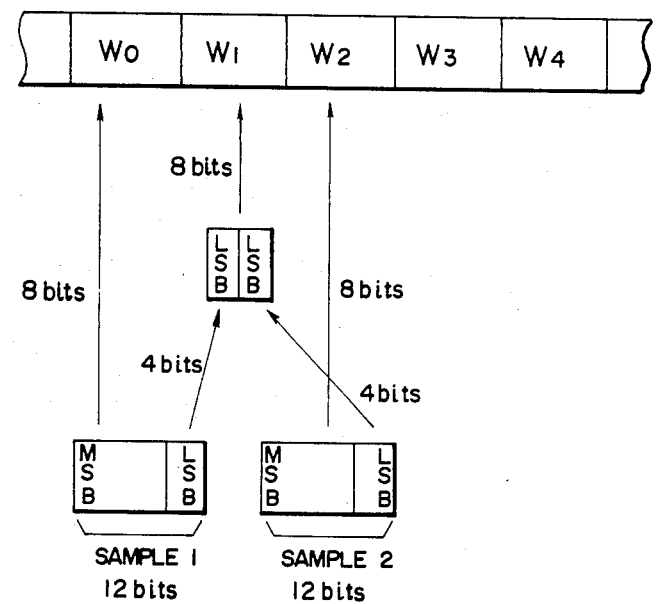

In the frames shown in FIGS. 6A and 6B, the bit numbers of the PCM data 3a and 3b are each constituted by 96 bits which is equal to a common multiple of the quantization bit numbers of 16 and 12 and remain constant independent of the different quantization bit numbers. When the PCM data is divided into symbols each of eight bits, each of the samples of the PCM data 3a including 16 bits is divided into two symbols each of eight bits, whereby twelve symbols $W_0, W_1, \ldots W_{11}$, are prepared, as illustrated in FIG. 7A. On the other hand, in the case of the PCM data 3b, each sample is divided into one symbol including eight bits and a group of four bits, as illustrated in FIG. 7B. These four remainder bits are combined with four bits resulting from the division of another sample to thereby constitute another symbol. In this way, twelve symbols $W_0, W_1, \ldots W_{11}$ are prepared and the number of the symbols included in the single frame can assume a constant value of twelve independent of the number of the quantization bits, as will be seen from FIGS. 6A, 6B, 7A and 7B. Here, it should be mentioned that symbols $P_0, P_1, P_2$ and $P_3$ of the error correction codes 4a and 4b shown in FIGS. 6A and 6B may be added in the form of Reed-Solomon code which can be prepared on the basis of the symbols $W_0, W_1, \ldots, W_{11}$ of the PCM data in accordance with the following expression:

$$\left. \begin{array}{l} IW_0 + IW_1 + IW_2 + \ldots + IW_{11} + IP_0 + IP_1 + IP_2 + IP_3 = 0 \\ T^{15}W_0 + T^{14}W_1 + T^{13}W_2 + \ldots + T^4W_{11} + T^3P_0 + T^2P_1 + TP_2 + IP_3 = 0 \\ T^{30}W_0 + T^{28}W_1 + T^{26}W_2 + \ldots + T^8W_{11} + T^6P_0 + T^4P_1 + T^2P_2 + IP_3 = 0 \\ T^{45}W_0 + T^{42}W_1 + T^{39}W_2 + \ldots + T^{12}W_{11} + T^9P_0 + T^6P_1 + T^3P_2 + IP_3 = 0 \end{array} \right\} \quad (2)$$

where I represents an identity element, and $T, T^2, T^4, \ldots, T^{45}$ represent individual non-zero elements of Galois field $(2^8)$. Further, multiplication and addition as indicated are operations defined by the Galois field.

Thus, by virtue of the arrangement in which the number of the symbols each included in the single frame of the PCM data 3a and 3b is constant independent of the different quantization bit numbers, as is illustrated in FIGS. 6A and 6B, the error correction codes 4a and 4b can be generated and decoded by using same respective arithmetic circuits.

Further, since the control data 2a and 2b, the PCM data 3a and 3b and the error correction codes 4a and 4b include, respectively, same numbers of bits, the error detection codes 5a and 5b can be prepared and added through a same arithmetic processing. In the case of the embodiment under consideration, it is assumed that the error detection code 4a is added in the form of CRC code (Cyclic Redundancy Check Code) of 16 bits to the control data 2a and the PCM data 3a. It will now be appreciated that by virtue of the frame arrangement elucidated above in conjunction with FIGS. 6A, 6B, 7A and 7B, a frame structure having a constant redundancy is available in common to both the PCM digital signals which are quantized in mutually different bit numbers, whereby generation and decoding of the error detection code and the error correction code can be accomplished through procedures common to both the PCM signals regardless of the different quantization bit numbers of 16 and 12 bits.

Figure 8:
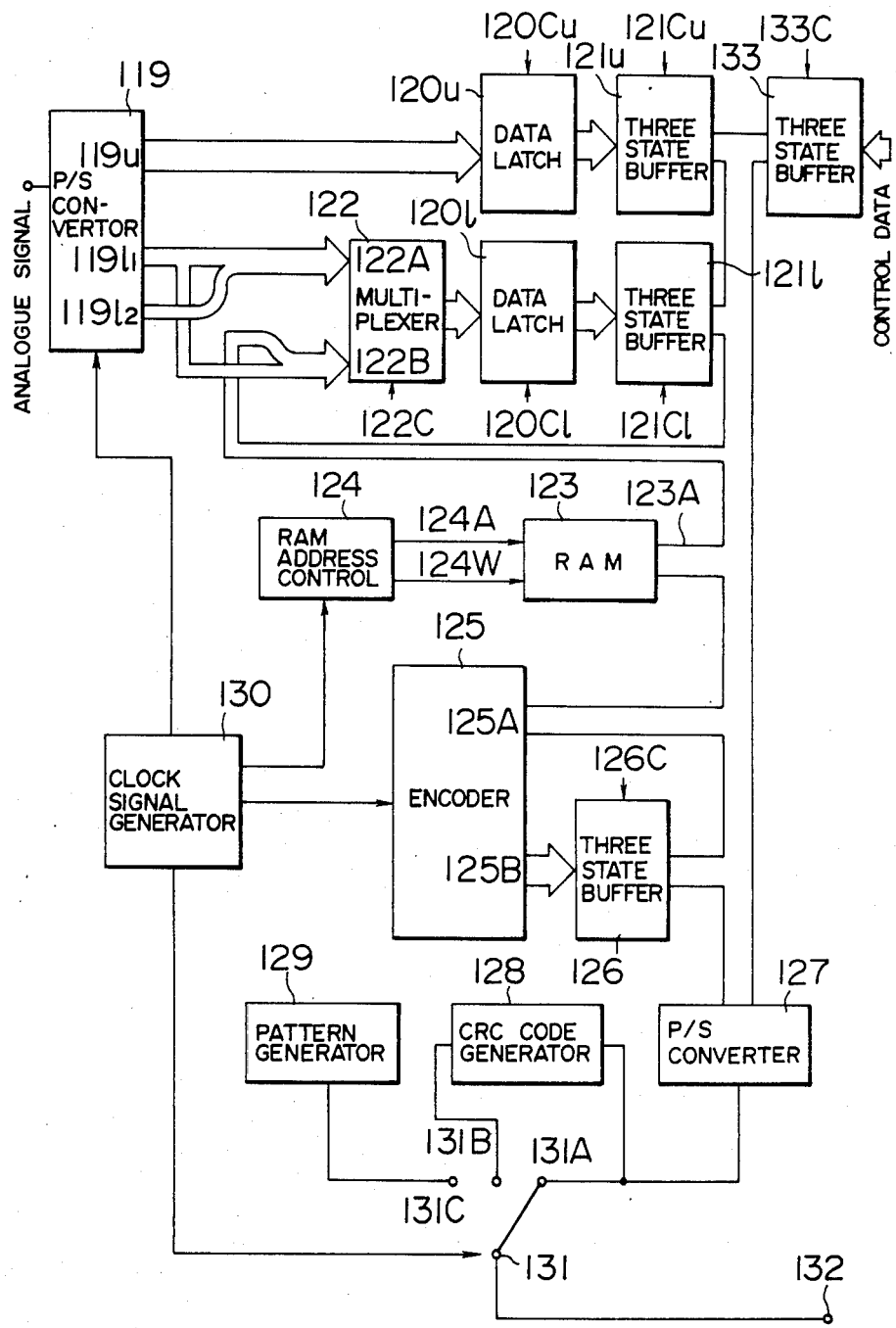
FIG. 8 is a block diagram showing an exemplary embodiment of a circuit for generating signals of the frame structures shown in FIGS. 6A, 6B, 7A and 7B.

FIG. 8 shows in a block diagram an exemplary embodiment of a frame creating circuit for realizing the frame structure or arrangement shown in FIGS. 6A and 6B. Referring to FIG. 8, a reference numeral 119 denotes a 16-bit A/D converter having three outputs 119u, 119l1 and 119l2, wherein the most significant eight bits make appearance at the output 119u, while the least significant eight bits are divided into two subsets each of four bits with one subset of four, bits being outputted from 119/1 while the other is outputted from 119/2. Reference symbols 120u and 120l denote data latches each of eight bits for latching data in the timing of clock input signals 120Cu and 121Cl, respectively. Reference symbols 121u, 121l, 126 and 133 denote, respectively, three-state buffers which are set to the output mode when respective control signals 121Cu, 121Cl, 126C and 133C are logic "0", while the buffers are set to a high-impedance state when the control signals mentioned above are logic "1". A reference numeral 122 denotes a multiplexer for selecting one of two input series 122A and 122B each of eight bits. When a control signal 122C is logic "0", the multiplexer 122 selects and outputs the input signal 122A while outputting the signal 122B when the control signal 122C is logic "1". A reference numeral 123 denotes a random access memory or RAM for storing data which has an 8-bit data bus connected to the individual circuits, wherein the most significant four bits of the data bus 123A are coupled to the input 122B of the multiplexer 122. A numeral 124 denotes a RAM address control circuit which serves for controlling the writing to the RAM 123 and has one output 124A for producing an address signal and another output 124W for producing a writing control pulse signal. A numeral 125 denotes an encoder for preparing the Reed-Solomon code having data input 125A and an output 125B for producing a parity Reed-Solomon code including the four symbols $P_0$, $P_1$, $P_2$ and $P_3$, which code is prepared on the basis of a series of the input data. A numeral 127 denotes a parallel-to-serial converter (hereinafter referred to as the P/S converter) for converting an 8-bit parallel signal into a serial signal. A numeral 128 denotes a CRC code generator having the input coupled to the output of the P/S converter 127 for preparing the CRC code mentioned hereinbefore. Further, a numeral 129 denotes a pattern generator for generating the frame synchronizing signal pattern, 131 denotes a switch for sequentially changing over a data output 131A, a CRC code output 131B and a frame synchronizing pattern output 131C from one to another, 132 denotes an output terminal, and finally 130 denotes a clock generator for generating control clocks for the various circuits mentioned above.

Now, operation of the frame generator of the arrangement shown in FIG. 8 will be described by first assuming that a PCM digital signal quantized in the bit number of 16 is to be processed. The control signal 122C of the multiplexer 122 is locked to the logic "0" level, whereby the least significant eight bit signals 119/1 and 119/2 of the A/D converter 119 connected to the input 122A of the multiplexer 122 are transmitted to the data latch 120l. Further, the most significant eight bit signal 119u outputted from the A/D converter 119 is applied to the data latch 120u. The outputs of these data latches 120u and 120l are supplied to the three-state buffers 121u and 121l, respectively, while the control signals 121Cu and 121Cl for these buffers are successively set to logic "0" level on the time-division basis to thereby allow the data to be transferred to the data bus 123A of the RAM 123 on the 8-bit basis (i.e. by eight-by-eight bits). The data on the bus 123A is stored in the RAM 123 under the command of the address signal 124A and the write-in control pulse 124W generated by the RAM address control circuit 124. The processing mentioned so far is performed repeatedly at the sampling frequency $f_s$ generated by the clock generator 130. Next, the processing of the output data of the A/D converter 119 stored in the RAM 123 will be described with reference to a memory map shown in FIG. 9. Referring to FIG. 9, the RAM 123 is divided into three blocks A, B and C and adapted to perform three processings, i.e. (1) processing for the writing-in of the output data of the A/D converter 119 and the control data, (2) processing for generating or creating the Reed-Solomon codes $P_0$ to $P_3$ serving as the error correction codes, and (3) processing for outputting serial data. More specifically, when the control data is written in through the buffer 133 with the data from the A/D converter 119 being loaded in the block A, data $W_0, \ldots, W_{11}$ are supplied to the encoder 125 to generate the error correction codes $P_0, \ldots, P_3$ in the block B, while the processing for outputting data to the P/S converter 127 takes place in the block C. Upon completion of the precessings in the individual blocks A, B and C mentioned above, the processing for generating the error correction codes (Reed-Solomon codes) $P_0, \ldots, P_3$ is performed for the data previously fetched from the A/D converter 119 in the block A, while processing for outputting the data containing the prepared error correction codes $P_0, \ldots, P_3$ is effected in the block B. On the other hand, in the block C, data write-in processing is performed for the fresh data from the A/D converter 119. In this manner, the three processings described above are sequentially effected in the blocks A, B and C, whereby the control data, the PCM data and the error correction codes $P_0, \ldots, P_3$ are outputted as the serial data signal from the P/S converter 127. The serial data signal outputted by the P/S converter 127 and containing the control data C, the PCM data $W_0, \ldots, W_{11}$ and the error correction data $P_0, \ldots, P_3$ is supplied to the CRC code generator circuit 128 to create or prepare the CRC code of 16 bits. The switch 131 sequentially changes over the data 131A outputted from the P/S converter 127, the CRC code outputted from the CRC code generating circuit 128 and the frame synchronizing signal pattern 131C to thereby constitute the final serial data signal, which is then outputted from the output terminal 132. Through the processing mentioned above, a frame of the structure shown in FIG. 6A can be generated for the PCM data quantized in 16 bits.

Figure 10:
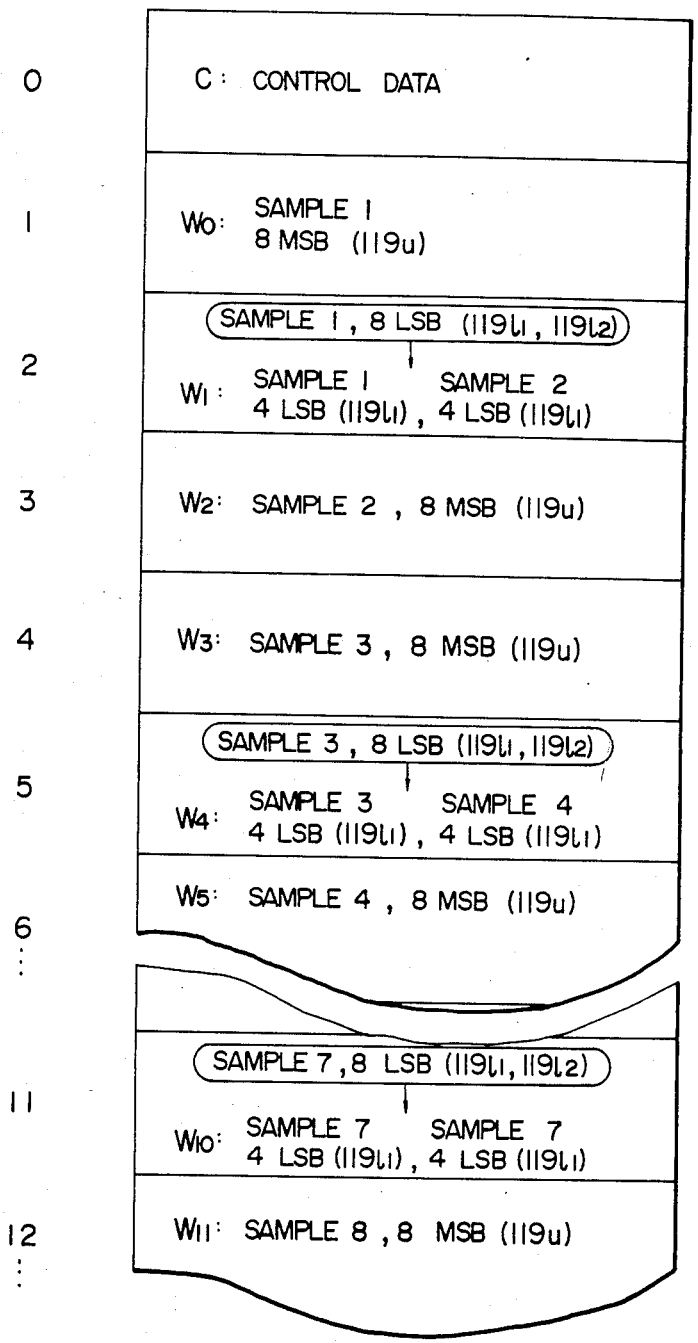

Next, operation of the frame generator shown in FIG. 2 will be described on the assumption that a PCM data signal in concern is quantized in 12 bits. The A/D converter 119 transmits therethrough the twelve more significant bits 119u and 119/1 out of sixteen bits. The control signal 122C for the multiplexer 122 is composed of an alternating series of "0" and "1" so that logic "0" output of the A/D converter 119 is selected for the first sample 1, logic "1" output of the A/D converter is selected for the second sample 2 and so forth. Consequently, the latch 120l is supplied with the outputs 119/1 and 119/2 of the A/D converter 119 for the sample 1, while the most significant four bits on the data bus 123A of the RAM 123 and the output 119/1 of the A/D converter 119 are applied to the latch 120l for the sample 2. The data written in the RAM 123 at that time will be elucidated by referring to a data map illustrated in FIG. 10. For the sample 1, the output data of the A/D converter 119 are latched by the latches 120u and 120l. Accordingly, the most significant eight bits of the sample 1 is stored in the block A of the RAM 123 at the address 1, while the least significant eight bits (the outputs 119/1 and 119/2 of the A/D converter 119) are stored at the address 2. Subsequently, at the time when the sample 2 is latched by the latches 120u and 120l, the RAM 123 outputs the least significant eight bits of the precedingly stored sample 1 (i.e. 119/1 and 119/2) onto the data bus 123A under the control of the RAM address control circuit 124. Thus, the data stored in the latch 120l through the multiplexer 8 contains the most significant four bits which are the least significant four bits (119/1) of the sample 1 and the least significant four bits which are the least significant four bits (119/1) of the sample 2. This data of the latch 120l is again written in the RAM 123 at the address 2, while the data of the latch 120u is written in the RAM 123 at the address 3. In this way, when the control signal 122C of the multiplexer 122 is logic "1", the RAM 123 outputs the least significant eight bits of the precedingly stored sample, which bits are again written in the RAM 123, whereby data of eight samples each of 12 bits can be stored in the block A of the RAM 123, as illustrated in FIG. 10. Since the data thus obtained is equivalent to the number of data for the PCM signal quantized in 16 bits, it is possible to generate or prepare the frame illustrated in FIG. 6B through the similar processings and operations as those for the 16-bit data. As will now be understood, the same frame structure or arrangement can be realized for both the PCM signals quantized in 16 bits and 12 bits, respectively, independent of the number of quantization bits without changing the redundance or without increasing appreciably the processing circuit scale. Although it has been assumed that the twelve more significant bits of the output of the A/D converter 119 is transmitted as the data quantized in 12 bits, it is obvious that the 12-bit data resulting from the instantaneous compressing and expanding of the 16-bit data can be transmitted in the same frame structure through the processings described above.

The PCM digital signals generated according to the aforementioned method can be recorded on the recording medium at substantially the same recording wavelength in substantially the same recording format by means of the recording/reproducing apparatus shown in FIG. 1. In this connection, the signal processing circuit 4 and the A/D converter 3 may be realized according to the circuit arrangement illustrated in FIG. 8. Further, the clock signal generator 18 shown in FIG. 1 may be imparted with the function of the clock signal generator 130 shown in FIG. 8. In this case, the oscillation frequencies of the reference signal generating oscillators 17, 27 and 28 are, respectively, selected to be integral multiples of the transmission rate and the sampling frequency for the given basic clocks of the three signal types mutually differing in respect of the sampling frequency and the quantization bit number. The transmission rate $f_{B1}$ for the sampling frequency $f_s$ of 44.1 KHz and the quantization bit number of 16 is given by the following expression (3) in view of the fact that the transmission is effected in the frame arrangement or structure shown in FIG. 6A. That is, $$f_{B1} = \frac{\text{Sampling Frequency}}{\text{Number of samples in one frame}} \times \quad (3)$$

(Number of bits in one frame)

Thus, the transmission rate $f_{B1}$ is equal to 1.176 Mbps. The frequency of the reference signal generator 17 generating the basic clock may be selected, for example, at 14.112 MHz equal to the transmission rate $f_{B1}$ multiplied with 12 so that the oscillation frequency of the generator 17 is an integral multiple of the sampling frequency. In the similar manner, the transmission rate $f_{B2}$ may be 1.28 Mbps with the frequency of the reference signal generator 27 being 15.36 MHz for the sampling frequency of 48 KHz and the quantization bit number of 16, while the transmission rate $f_{B3}$ may be 0.64 Mbps with the frequency of the reference signal generator being 7.68 MHz for the sampling frequency of 32 KHz and the quantization bit number of 12. In this connection, the revolution speed of the rotating head assembly 8 which is controlled by the revolution number controlling circuit 30 may be set at 30 rps for the sampling frequency of 44.1 KHz, the quantization bit number of 16 and the transmission rate $f_{B1}$ of 1.176 MHz so that the head revolution number of 32.7 rps may be selected starting from the above reference revolution number of 30 rps for the sampling frequency of 48 KHz, the quantization bit number of 16 and the transmission rate $f_{B2}$ of 1.28 MHz while the revolution number may be selected at 16.3 rps for the sampling frequency of 32 KHz, quantization bit number of 12 and the transmission rate $f_{B3}$ of 0.64 MHz, to thereby accomplish the high efficiency of the recording, as described hereinbefore in conjunction with the revolution number control circuit 30.

On the other hand, the tape speed control circuit 31 serves for controlling the transportation speed of the recording medium in proportional dependence on the transmission rate of the PCM digital signal to be recorded, because the track width as well as the track pitch will be changed when the revolution number of the rotating head drum is varied as a function of the transmission rate with the tape transportation speed being maintained constant. In the case of the instant embodiment of the invention in which the PCM digital signals are transmitted in the same frame structure independent of the different quantization bit numbers of the signals, the tape transportation speed may be set at 6 mm/second for the sampling frequency of 44.1 KHz, the quantization bit number of 16 and the transmission rate $f_{B1}$ of 1.176 MHz. On the basis of this tape transportation speed which serves as the reference feed speed, the tape speed may be selected at 6.5 mm/second when the sampling frequency is 48 KHz, the quantization bit number is 16 and the transmission rate $f_{B2}$ is 1.28 MHz, while the tape speed may be set at 3.3 mm/second for the sampling frequency of 32 KHz, quantization bit number of 12 and the transmission rate $f_{B3}$ of 0.64 MHz. In this way, the track width as well as the track pitch can be maintained constant on the recording medium.

In the foregoing description, it has been assumed that the concept of the present invention is applied to a magnetic recording/reproducing apparatus in which a rotating head is employed. It should however be understood that the invention can equally be applied to a magnetic recording/reproducing apparatus in which stationary heads are employed for handling simultaneously a number of tracks. In the following, description will be made on the stationary head type recording/reproducing apparatus according to another embodiment of the invention. The signal processings in the stationary head type apparatus are in principle similar to those performed in the rotating head type recording/reproducing apparatus. More specifically, in order to allow PCM digital signals quantized in different bit numbers $n_{s1}$ and $n_{s2}$, respectively, to be transmitted in a same frame structure also in the stationary head type recording/reproducing apparatus, a common multiple of the bit numbers $n_{s1}$ and $n_{s2}$ is selected as the bit number of the PCM data which is then added with error detection and correction codes each composed of a predetermined number of symbols each of which in turn is constituted by a predetermined number of bits, to thereby create a frame without varying redundancy. Upon recording of the PCM digital signal thus obtained on the recording medium, the recording wavelength as well as the recording format on the recording medium can be maintained constant by varying the feed speed of the recording medium in proportion to the transmission rate, whereby PCM digital signals of different sampling frequencies and different quantization bit numbers can be recorded and/or reproduced with high efficiency by one and the same stationary head type recording/reproducing system or apparatus. In the following description of the exemplary embodiment of the invention applied to the stationary head type magnetic recording/reproducing apparatus, it is assumed that differences in the quantization bit numbers as well as the sampling frequencies are the same as those assumed in the preceding embodiment. The description is first directed to a method and a signal processing circuit for creating the same frame structure for two different PCM digital signals quantized in 16 bits and 12 bits, respectively.

Subsequently, an exemplary embodiment of the stationary head type digital signal recording/reproducing apparatus in which the digital signal thus obtained is recorded on the recording medium with a constant recording wavelength and in a predetermined recording format.

Figure 11:
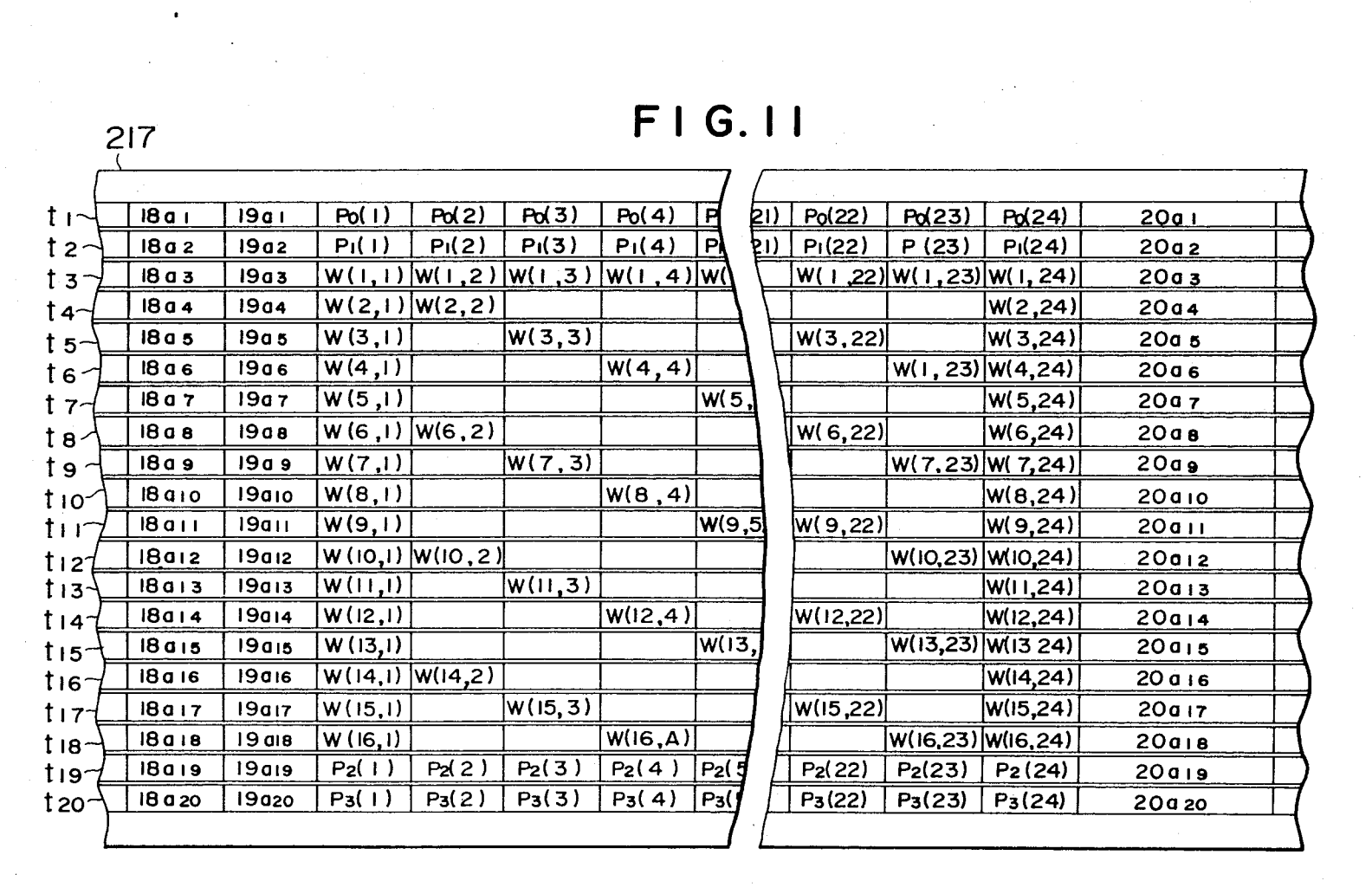

FIG. 11 shows a frame structure which can be same for different PCM digital signals quantized in different bit numbers of 16 and 12. In FIG. 11, a numeral 217 denotes a magnetic tape for the recording medium. Reference symbols $t_1$ to $t_{20}$ designate tracks recorded on the magnetic tape 217. Further, 18$a$1 to 18$a$20 denote frame synchronizing signal patterns each of 8 bits, 19$a$1 to 19$a$20 designate control data each of 8 bits for control or the like information required by the apparatus in addition to the PCM data, and 20$a$1 to 20$a$20 designate CRC codes for error detection each of 16 bits, w(i, j) represent data for a single symbol constituted by 8 bits where i represents an identifying number in the trackwise or transversal direction and may take one of 1, 2, 3, ..., 16 while j represents an identifying number in the tape running or longitudinal direction and may take one of 1, 2, 3, ..., 24, and $P_0(j)$, $P_1(j)$, $P_2(j)$ and $P_3(j)$ designate the symbols for the error correction codes, where j represents an identifying number in the tape running direction and may assume one of 1, 2, 3, ..., 24.

Figure 12A:
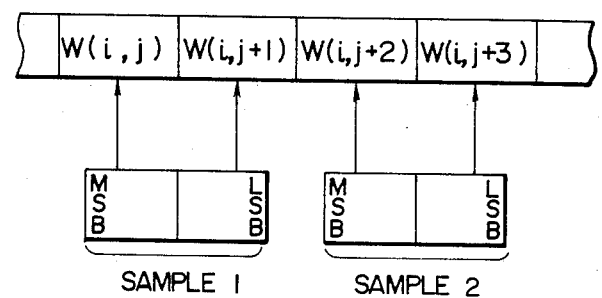
Figure 12B:
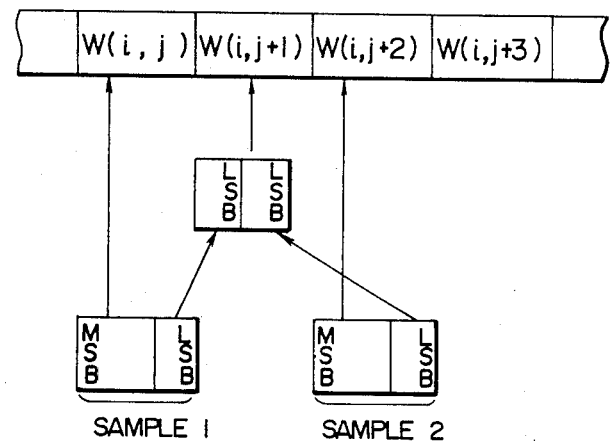

FIGS. 12A and 12B show two different sample data quantized in 16 bits and 12 bits, respectively, each in the state divided into symbols. FIG. 12A illustrates a sample of 16 bits divided into two symbol containing, respectively, the most significant eight bits and the least significant eight bits. FIG. 12B shows a sample of 12 bits which are divided into the most significant eight bits and the least significant four bits, the latter four bits being combined with the least significant four bits of another sample to thereby constitute one symbol. In other words, the division of the sample into the symbols is effected in the same manner as in the case of the preceding embodiment. Since the number of the symbols of each track is 24 as shown in FIG. 11, the number of the samples in each track is twelve for the data quantized in 16 bits, while the sample number per track is sixteen for the data quantized in 12 bits, because the sample is divided into the symbols in the manner mentioned above. Referring to FIG. 11, the bit number and the symbol number of the PCM data arranged in respective frames are the same regardless of the differences in the number of the quantization bits. The error detection code 20$a$3 is created and added in the form of CRC code of 16 bits on the basis of the control data 19$a$3 and the PCM data w(1, j) (where j = 1, ..., 24) belonging to the same track $t_3$. In other tracks, the respective error detection codes are generated and added in a similar manner. Accordingly, common procedures may be adopted for generating and decoding the error detection codes independent of a difference in the number of the quantization bits. Further, the error correction codes $P_0(j)$, $P_1(j)$, $P_2(j)$ and $P_3(j)$ where j = 1, ..., 24 are created in the form of Reed Solomon code on the basis of the symbols arrayed trackwise in accordance with the following expression:

$$\left.\begin{aligned} Iw(1,j) + Iw(2,j) + \ldots + Iw(16,j) + IP_0(j) + IP_1(j) + IP_2(j) + IP_3(j) &= 0 \\ T^{19}w(1,j) + T^{18}w(2,j) + \ldots + T^4w(16,j) + T^3P_0(j) + T^2P_1(j) + TP_2(j) + IP_3(j) &= 0 \\ T^{38}w(1,j) + T^{38}(2,j) + \ldots + T^8w(16,j) + T^6P_0(j) + T^4P_1(j) + T^2P_2(j) + IP_3(J) &= 0 \\ T^{57}w(1,j) + T^{54}(2,j) + \ldots + T^{12}w(16,j) + T^9P_0(j) + T^6P_1(j) + T^3P_2(j) + IP_3(j) &= 0 \end{aligned}\right\} \quad (4)$$

where j = 1, 2, ... and 24, I represents identity element, and T, $T^2$, $T^3$, ..., $T^{57}$ represent the individual nonzero elements of Galois field. Multiplications and additions as indicated are operations defined by the Galois field.

In this way, the error correction code creating and decoding procedures can remain unchanged independent of the different quantization bit numbers and thus can be used in common to both the data signals quantized in 16 bits and 12 bits, respectively.

Figure 13:
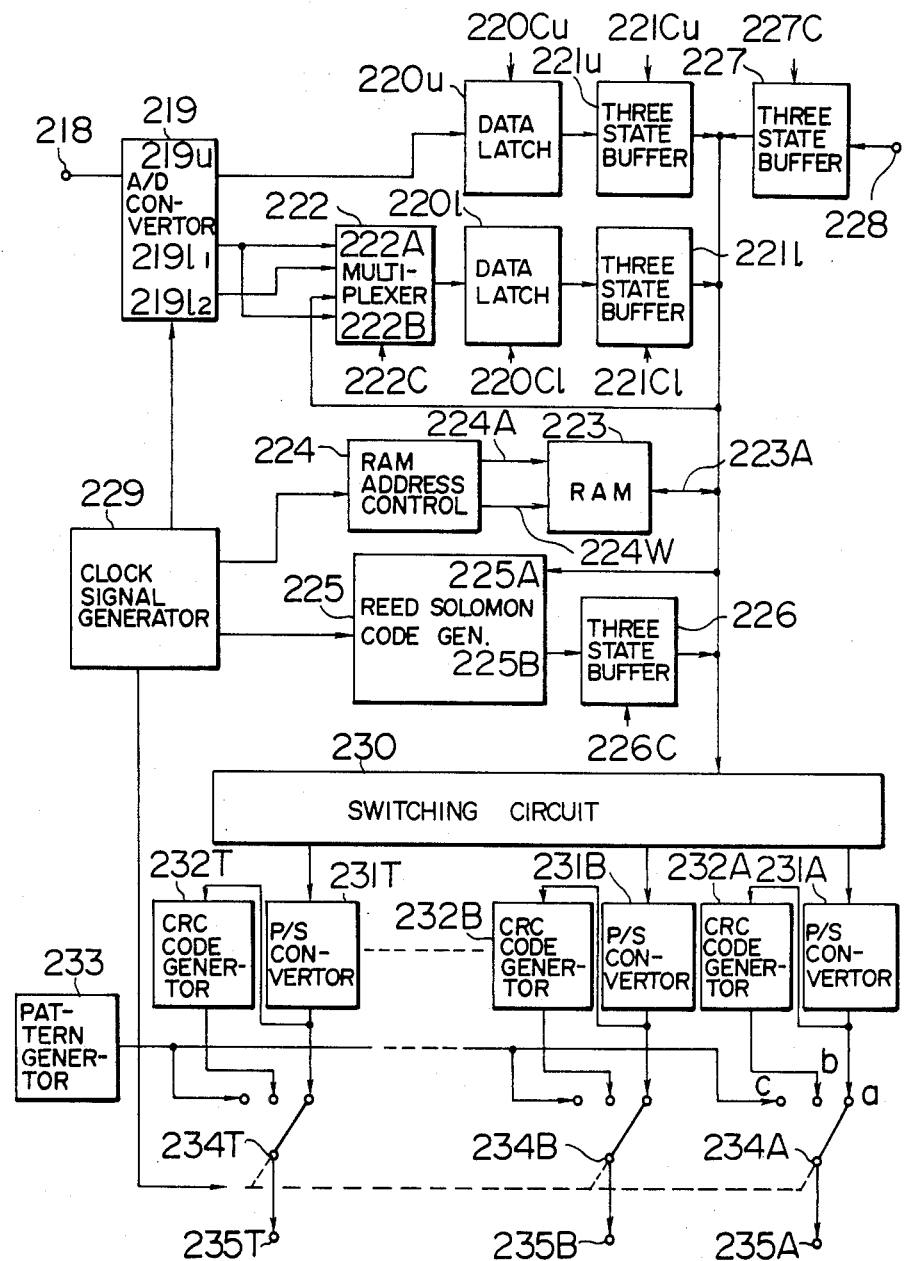
FIG. 13 is a block diagram showing an exemplary embodiment of a signal processing circuit for generating a signal of the frame structure shown in FIG. 11.

FIG. 13 shows in a block diagram an exemplary embodiment of a frame creating circuit for realizing the frame structure of arrangement shown in FIG. 11. Referring to FIG. 13, a reference numeral 218 denotes an analogue signal input terminal, 219 denotes a 16-bit A/D converter having three outputs 219$u$, 219$l_1$ and 219$l_2$, wherein the most significant eight bits make an appearance at the output 219$u$, while the least significant eight bits are divided into two subsets each of four bits and the subsets are outputted from 219$l_1$ and 219$l_2$, respectively. Reference symbols 220$u$ and 220$l$ denote data latches each of eight bits for latching data at the timing of clock input signals 220C$u$ and 220C$l$, respectively. Reference symbols 221$u$, 221$l$, 226 and 227 denote, respectively, three-state buffers which are set to the output mode when respective control signals 221C$u$, 221C$l$, 226C and 227C are logic "0", while the buffers are set to a high-impedance state when the control signals mentioned above are logic "1". A reference numeral 222 denotes a multiplexer for selecting one of two input series 222A and 222B each of eight bits. When a control signal 222C is logic "0", the multiplexer 222 selects and outputs the input signal 222A while outputting the signal 222B when the control signal 222C is logic "1". A reference numeral 223 denotes a random access memory or RAM for storing data which has an 8-bit data bus connected to the individual circuits, wherein the most significant four bits of the data bus 223A are coupled to the input 222B of the multiplexer 222. A numeral 224 denotes a RAM address control circuit which serves for addressing and controlling writing to the RAM 223 and has one output 224A for producing an address signal and other output 224W for producing a writing control pulse signal. A numeral 225 denotes an encoder for preparing the Reed Solomon code and has a data input 225A and an output 225B for producing a parity Reed Solomon code including the four symbols $P_0$, $P_1$, $P_2$ and $P_3$, which code is prepared on the basis of a series of the input data. A numeral 228 denotes an input terminal for a control data signal of eight bits, 230 denotes a switching circuit for dispersing the data on the data bus 223A of the RAM 223 into data which correspond to the twenty tracks, respectively, 231A, 231B, ..., 231T denote parallel-to-serial converters (hereinafter referred to as the P/S converter) each for converting an 8-bit parallel signal into a serial signal, and numerals 232A, 232B, ..., 232T denote CRC code generators having the respective inputs coupled to the outputs of the P/S converters for preparing the CRC codes mentioned hereinbefore. Further, a numeral 233 denotes a pattern generator for generating the frame synchronizing signal pattern, 234A, 234B, ..., 234T denote switches for sequentially changing over data outputs of the P/S converters 231A, 231B, ..., 231T, CRC code outputs of the CRC circuits 232A, 232B, ..., 232T and the frame synchronizing pattern output of the pattern generator 233. Symbols 235A, 235B, ..., 235T denote output terminals corresponding to the individual tracks, respectively, and finally 229 denotes a clock generator for generating control clocks for the various circuits mentioned above.

Now, operation of the frame generator of the arrangement shown in FIG. 13 will be described by first assuming that a PCM digital signal quantized in the bit number of 16 is to be processed. The control signal 22C of the multiplexer 222 is locked to the logic "0" level, whereby the least significant eight bit signals $219l_1$ and $219l_2$ of the A/D converter 219 connected to the input 222A of the multiplexer 222 are transmitted to the data latch $220l$. Further, the most significant eight bit signal $219u$ outputted from the A/D converter 219 is supplied to the data latch, $220u$. In this way, the data quantized in 16 bits is stored in the latches $220u$ and $220l$ in the timing of the clock signals 220Cu and 220Cl. The outputs of these data latches $220u$ and $220l$ are supplied to the three-state buffers $221u$ and $221l$, respectively, while the control signals 221Cu and 221Cl for these buffers are successively set to logic "0" level on the time-division basis to thereby allow the data to be transferred to the data bus 223A of the RAM 223 on the every 8-bit unit. The data on the bus 223A is stored in the RAM 223 under the command of address signal 224A and the write-in control pulse 224W generated by the RAM address control circuit 224. The processing mentioned so far is performed repeatedly at the sampling frequency $f_s$ generated by the clock generator 229.

The RAM 123 is divided into three blocks and adapted to perform sequentially three processings, i.e. (1) processing for the writing-in of the output data of the A/D converter 219 and the control data 228, (2) processing for generating or creating the Reed Solomon codes $P_0$ to $P_3$ serving as the error correction code, and (3) processing for the outputting of data. The capacity of one block is 20×25 bytes, exclusive of the frame synchronizing patterns 18a1, 18a2, ..., 18a20 and the CRC codes 20a1, 20a2, ..., 20a20 in the frame structure shown in FIG. 11. More specifically, in the first block, the control data of 20 bytes is written in through the buffer 227 and loaded at the addresses corresponding to the locations 19a1, 19a2, ..., 19a20 shown in FIG. 11. Further, from the data outputted from the A/D converter 219, the most significant eight bits of the first sample is stored at the location w(1, 1) with the least significant eight bits being stored at w(1, 2), the most significant eight bits and the least significant eight bits of the succeeding sample data are written at locations w(2, 1) and w(2, 2) and so forth. After the corresponding bits of the sample data have been stored at the location w(16, 1) and w(16, 2), the sequential storages of the data bits are repeated again starting from the storage locations w(1, 3) and w(1, 4) in the similar manner. In this manner, the data of 16×24 bytes outputted by the A/D converter 219 are stored in the first block. In parallel with the processing described above, in the second block of the RAM 223, the data corresponding to w(1, 1), w(2, 1), ..., w(16, 1) shown in FIG. 11 are supplied to the code generating circuit 225 to thereby prepare the data correction codes $P_0(1)$, $P_1(1)$, $P_2(1)$ and $P_3(1)$ which are subsequently written in the RAM 223. In this way, the data correction codes $P_0(j)$ to $P_3(j)$ are sequentially created and written in the RAM 223. Further, in the third block of the RAM 223, data isC supplied to the switching circuit 230 to thereby allow the data corresponding to the individual tracks shown in FIG. 11 to be sequentially outputted to the P/S converters 231A, 231B, ..., 231T. Upon completion of the above mentioned processings in the first, second and third blocks, the processing for generating the error correction codes (Reed Solomon codes) $P_0$, ..., $P_3$ for the previously loaded data of the A/D converter 219 in the first block, while processing for outputting the data containing the prepared error correction codes is effected in the second block. On the other hand, in the third block, the data write-in processing is performed for the fresh data from the A/D converter 219. In this manner, the three processings described above are sequentially effected in the three blocks, whereby the signals for twenty tracks (the control data, the PCM data and the error correction codes $P_0(j)$, ..., $P_3(j)$ are outputted as the serial signals from the P/S converter 231A, 231B, ..., 231T. These output signals are supplied to the CRC circuit 232A, 232B, ..., 232T to create or prepare the CRC codes each of 16 bits. The switches 234A, 234B, ..., 234T sequentially change over the signals outputted from the P/S converter 231A, 231B, ..., 231T, the CRC codes outputted from the CRC codes generating circuits 232A, 232B, ..., 232T, and the signal from the frame synchronizing signal pattern generator 233, to thereby constitute the final data format to be outputted from the output terminals 235A, 235B, ..., 235T. Through the processings mentioned above, the frame of the structure shown in FIG. 11 can be generated for the PCM data quantized in 16 bits.

Next, operation of the frame generator shown in FIG. 13 will be described on the assumption that a PCM data signal in concern is quantized in 12 bits. The A/D converter 219 transmits therethrough the twelve more significant bits $219u$ and $219l_1$ out of sixteen bits. The control signal 222C for the multiplexer 222 is composed of series of "0" and "1" alternating every sixteen samples in such a manner in which logic "0" outputs of the A/D converter 219 are selected for the sample 1 to 16, logic "1" outputs of the A/D converter 219 are selected for the samples 17 to 32, logic "0" for the sample 33 to 48 and so forth. Consequently, the latch 220*l* is supplied with the outputs 219*l*₁ and 219*l*₂ of the A/D converter 219 for the samples 1 to 16, while the most significant four bits on the data bus 223A of the RAM 223 and the output 219*l*₁ of the A/D converter 219 are applied to the latch 220*l* for the samples 17 to 32. In the course of the processings mentioned just above, data of the samples 1 to 16 are written in the RAM 223 at the addresses corresponding to the locations w(1, 1), w(1, 2), ..., w(16, 1) and w(16, 2) as in the case of the aforementioned data signal quantized in 16 bits. As the result, the locations w(1, 1) to w(16, 1) are placed with the data of the most significant eight bits outputted from the A/D converter 219, while the locations w(1, 2) to w(16, 2) are placed with the least significant eight bits. Subsequently, upon fetching of data of the sample 17, the RAM 223 outputs the data at the location w(1, 2). Consequently, the data loaded in the latch 220*l* is constituted by the least significant four bits of the preceding sample corresponding to w(1, 1) and the least significant four bits of the instant sample because the multiplexer 222 selects the input 222B. Further, the most significant eight bits of the sample 17 are loaded in the latch 220*u*. The data loaded in the latch 220*u* is written in the RAM 223 at the address corresponding to w(1, 3), while the data stored in the latch 220*l* is again written in the RAM at the address corresponding to w(1, 2). By repeating the operation mentioned above for the samples 18 to 32, data constituted by the least significant four bits of two samples are stored at the locations w(1, 2) to w(16, 2), while the locations w(1, 3) to w(16, 3) are loaded with the most significant eight bits of the samples 17 to 32, respectively. By carrying out the processings mentioned above for other samples in the similar manner, the division into the symbols illustrated at FIG. 12B can be realized. Since the data thus obtained are equivalent in the number of data to the data for the PCM signal quantized in 16 bits, it is possible to generate or prepare the frame illustrated in FIG. 11 through the similar processings and operations as those for the 16-bit data.

As will now be understood, an identical frame structure or arrangement can be realized for both the PCM signals quantized in 16 bits and 12 bits, respectively, independent of the number of quantization bits without changing the redundancy or without increasing appreciably the circuit scale. Although it has been assumed that the twelve more significant bits of the output of the A/D converter 219 is transmitted as the data quantized in 12 bits, it is obvious that the 12-bit data resulting from the instantaneous companding of the 16-bit data can be transmitted in the identical frame structure through the processings described above.

The PCM digital signals generated in the manner illustrated in FIG. 11 by the method described above can be recorded on the recording medium at a substantially same recording wavelength in a substantially same recording format by means of a stationary head type multitrack recording/reproducing apparatus which will be described below.

FIG. 14 shows in a block diagram a PCM digital recording/reproducing apparatus according to another embodiment of the present invention. In FIG. 14, a reference numeral 201 denotes an analogue signal input terminal, 202 and 213 denote sample and hold circuits, 203 denotes an A/D converter, 212 denotes a D/A converter, 204 and 211 denote signal processing circuits, 205*a*, 205*b*, ..., 205*s* and 205*t* denote recording amplifiers provided in correspondence to the recording tracks, respectively, 206*a*, 206*b*, ..., 206*s* and 206*t* denote recording heads, 209*a*, 209*b*, ..., 209*s* and 209*t* denote reproducing amplifiers, 210*a*, 210*b*, 210*c*, ..., 210*s* and 210*t* denote waveform equalizer circuits, 214 denotes an analogue signal output terminal, 215 denotes a reference signal generator, and 216 denotes a clock signal generator.

The circuit arrangement constituted by the components mentioned above is a basic structure for recording and reproducing the PCM signal of a certain signal type. In operation, an analogue signal applied to the analogue signal input terminal 201 is sampled by the sample and hold circuit 202 and converted into a PCM digital signal by means of the A/D converter 203. Subsequently, the PCM digital signal is added with error detection and correction codes, a synchronizing signal code and the like in the signal processing circuit 204 of the recording system and amplified by recording amplifiers 205*a*, 205*b*, ..., 205*s* and 205*t* provided in correspondence to the twenty tracks, respectively, to be recorded on the recording medium 207 traveling at a predetermined speed.

In reproducing operation, the signal recorded on the recording medium 207 is reproduced by the reproducing heads 208*a*, 208*b*, ..., 208*s* and 208*t* and after having been amplified by the reproducing amplifiers 209*a*, 209*b*, ..., 209*s* and 209*t*, supplied to the waveform equalizer circuits 210*a*, 210*b*, ..., 210*s* and 210*t*, where degradation in the transmission characteristic brought about by the recording medium 207 and the reproducing heads 208*a*, 208*b*, ..., 208*s* and 208*t* is compensated. After the error detection and correction executed by the signal processing circuit 211 of the recording system, the digital signal is converted into the analogue signal through the D/A converter 212, which analogue signal is resampled by the sample and hold circuit 213 to be outputted from the analogue signal output terminal 214. The sample and hold circuits 202 and 213, the A/D converter 203, the D/A converter 212, the signal processing circuits 204 and 211 of the recording and reproducing systems are operated at the timings given by clock signals generated by the clock generator circuit 216 on the basis of a reference clock generated by the reference signal generator 215.

In the stationary head type PCM digital signal recording/reproducing apparatus shown in FIG. 14, there are further provided components mentioned below in addition to the basic structure described above according to a feature of the invention. More specifically, referring to FIG. 14, a reference numeral 302 denotes a dubbing input terminal directly applied with a digital signal, and 300 denotes a switching control circuit for changing over three varieties of signal standards of sampling frequency of 44.1 KHz and quantization bit number of 16, sampling frequency of 48 KHz and quantization bit number of 16, and sampling frequency of 32 KHz and quantization bit number of 12. A numeral 301 denotes an input terminal for the switching control circuit 300 in recording mode, and 304 denotes an input terminal for the switching control circuit 300 in the reproducing mode, the input terminal 304 being applied with control data supplied by the signal processing circuit 211 belonging to the reproducing system. A reference numeral 303 denotes a transportation speed control circuit for the recording medium, 251 and 252 denote reference signal generators, respectively, 253 denotes a reference signal selecting circuit, 210a1, 210a2, ..., 210s1 and 210t2 denote waveform equalizer circuits differing from the equalizer 210a, ..., 210t in respect to the frequency characteristic, 210a3, ..., 210t3 denote reproduced signal selecting circuits, and a numeral 305 denotes a digital dubbing output terminal.

Describing operation of the apparatus shown in FIG. 14, the reference signal generators 215, 251 and 252 generate basic clocks for the three varieties of the signal standards differing in respect to the sampling frequency and the quantization bit number, the basic clocks being integral multiples of the transmission rates and the sampling frequencies. In this connection, the transmission rate for the sampling frequency $f_s$ of 44.1 KHz and the quantization bit number of 16 can be determined in accordance with the expression (3) mentioned hereinbefore, because the transmission is performed in the frame structure or arrangement illustrated in FIG. 11. More specifically, when the sampling frequency of 44.1 KHz, the sample number of 16×12 in a single frame, and the bit number of 224×20 in a single frame are placed in the expression (3), the transmission rate $f_{B1}$ is determined to be 1.029 Mbps. The frequency of the reference signal generator 215 for generating a basic clock is selected to be 12.348 MHz which is equal to the transmission rate $f_{B1}$ multiplied with 12 so that the frequency in concern is an integral multiple of the sampling frequency $f_s$. In the similar manner, the transmission rate $f_{B2}$ corresponding to the sampling frequency of 48 KHz and the quantization bit number of 16 is determined to be 1.12 Mbps. Accordingly, the corresponding frequency of the reference signal generator 251 is 13.44 MHz. The transmission rate $f_{B3}$ corresponding to the sampling frequency of 32 KHz and the quantization bit number of 12 is determined to be 0.56 Mbps. Accordingly, the corresponding frequency of the reference signal generator 252 is 6.72 MHz. These three oscillation frequencies of the reference signal generators 215, 251 and 252 are subjected to the selection by the reference signal selecting circuit 253, whereby the selected frequency is supplied to the clock generating circuit 216 to change the timings at which the sample and hold circuits 202 and 213, the A/D converter 203, the D/A converter 213, the signal processing circuit 204 of the recording system and the signal processing circuit 211 of the reproducing system are operated, as in the case of the preceding embodiment. The switching control circuit 300 produces a control signal for commanding the selections effected by the reference signal selecting circuit and the reproducing signal selecting circuits 210a3, ..., 210t3, and also produces a control data signal, which is applied to the input terminal 228, utilized for indicating a type of recorded signal system. The control of the switching control circuit 300 may be effected manually in accordance with the sampling frequency and the quantization bit or automatically by detecting automatically these information from the input signal applied to the digital dubbing input terminal 302 and applying the detected information signal to the control input terminal 301, as in the case of the preceding embodiment. In the reproducing operation, the automatic detection and control can be realized by supplying the control data reproduced through the signal processing circuit 211 of the reproducing system to the terminal 304.

The speed control circuit 303 serves for controlling the transportation speed of the recording medium in proportional to the transmission rate of the PCM digital signal to be recorded. In general, in case the PCM digital signal is to be recorded on the recording medium, the maximum frequency which can be recorded is determined in dependence on the transmission characteristic which in turn is determined by the recording medium and the recording reproducing heads as employed. Since the transmission characteristic depends on the wavelength of the signal to be recorded, the recording can be effectively accomplished without involving appreciable waste of the recording medium by varying the feed speed of the recording medium in accordance with the transmission rate. Accordingly, in order to effect the recording with a high effeciency, the feed speed may be set, for example, at 4.75 cm/second by means of the feed speed control circuit 303 for the standard signal of the sampling frequency of 44.1 KHz, quantization bit number of 16 and thus the transmission rate $f_{B1}$ of 1.029 Mbps. With reference to this speed, the feed speed corresponding to the sampling frequency of 48 KHz, the quantization bit number of 16 and the transmission rate $f_{B2}$ of 1.12 Mbps may be set at 5.17 cm/second, while the feed speed for the sampling frequency of 32 KHz, the quantization bit number of 12 and the transmission rate $f_{B3}$ of 0.56 Mbps may be set at 2.585 cm/second.

As described hereinbefore, by varying the feed speed of the recording medium 207 in proportion to the transmission rate of the signal to be recorded, the shortest wavelength on the recording medium can always remain constant, resulting in that the waveform equalizing characteristic also remains constant. However, since the frequency of the recorded signal varies in dependence on the varieties of the signal standards, the waveform equalization characteristic is shifted along the frequency axis. To deal with this problem in the apparatus shown in FIG. 14, there are provided the waveform equalizer 210a, 210b, ..., 210s and 210t for the signal type of the sampling frequency of 44.1 KHz, the quantization bit number of 16 and the transmission rate $f_{B1}$ of 1,029 Mbps, the waveform equalizers 210a1, 210b1, ..., 210s1 and 210t1 for the sampling frequency of 48 KHz, the quantization bit number of 16 and the transmission rate $f_{B2}$ of 1.12 Mbps, and the waveform equalizers 210a2, 210b2, ..., 210s2 and 210t2 for the sampling frequency of 32 KHz, the bit number of 12 and the transmission rate $f_{B3}$ of 0.56 Mbps, wherein the outputs of the waveform equalizer which conform to the existent or current transmission rate are selected by means of the reproduced signal selecting circuits 210a3, 210b3, ..., 310s3 and 210t3 to be subsequently supplied to the signal processing circuit 211.

As described hereinbefore, the same frame structure for the PCM signals differing in respect to the quantization bit number can be realized with the aid of the circuit shown in FIG. 8 or FIG. 13. However, the invention is not restricted to the frame structures illustrated. Other versions of the frame structure are possible which are constant in redundancy and allow the circuits for creating and decoding the error detection code to be used in common.

Next, description will be made of the versions of the frame structure according to the invention. In should first be pointed out that the versions of the frame structure mentioned below can be realized by slightly modifying the processings performed by the circuits shown in FIGS. 8 and 13 whose basic arrangement may thus remain unchanged.

Figure 15A:
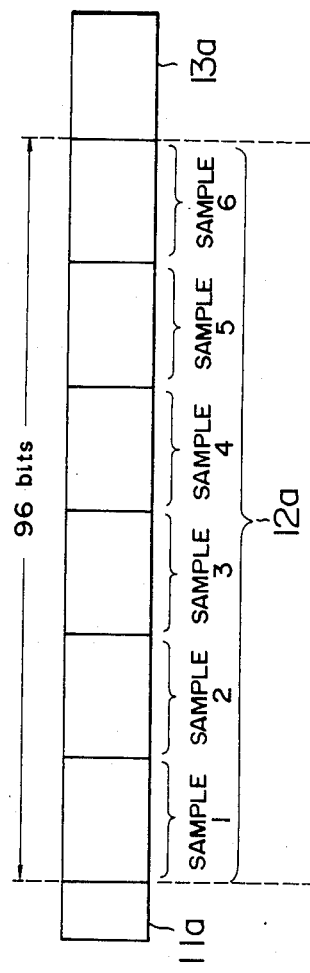
Figure 15B:
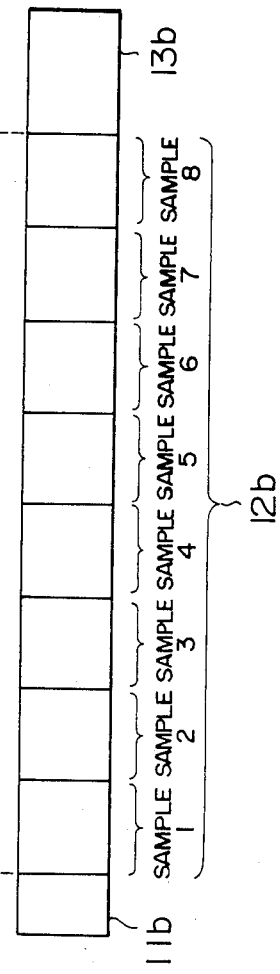

FIGS. 15A and 15B show the versions of the frame structure. More particularly, FIG. 15A illustrates an example or version of the frame structure for the PCM digital signal quantized in 16 bits, while FIG. 15B shows a version of the frame structure for the PCM digital signal quantized in 12 bits. Referring to the figures, 11a and 11b designate frame synchronizing signal patterns each of 12 bits, 12a and 12b designate the PCM data, and 13a and 13b designate error detection and correction codes. The bit number of the PCM data 12a and 12b are selected to be 96 bits which is a common multiple of the quantization bit numbers of 16 and 12. Accordingly, six data samples each of 16 bits and eight samples each of 12 bits constitute, respectively, the PCM data in the respective frames. By virtue of the fact that the PCM data 12a and 12b are both constituted by 96 bits, the error detection and correction codes 13a and 13b can be prepared and added through same arithmetic processing. It is assumed that a CRC code of 16 bits is to be added as the error detection code. Thus, the total number of bits are 124 in common to both the frames, which means that the redundancy is constant, the error detection code generating and decoding circuits can be used in common to both frames, and that the circuit scale need not be appreciably enlarged, which is an advantage.

For generating the error detection and correction codes, there has been known a method of dividing the PCM data sample into symbols each of a predetermined bit number. For example, there may be mentioned the Reed-Solomon code. FIGS. 16A and 16B show, by way of example, frame structures in which the PCM data samples of 16 bits and 12 bits are divided into symbols each of four bits which is a common divisor of both the quantization bit numbers (i.e. 16 and 12) and in which the error detection and correction codes each of two symbols are created and added. More particularly, FIG. 16A shows a frame structure for the quantization bit number of 16, while FIG. 16B shows a frame structure for the quantization bit number of 12. In the figures, $w_1$, $w_2$, ..., $w_{12}$ denote the symbols of the PCM data 12a and 12b, respectively, and $P_1$ and $P_2$ designate the symbols of the error detection and correction codes 13a and 13b, respectively. Other codes are same as those shown in FIGS. 15A and 15B. In the case of the PCM data 12a, three samples each quantized in 16 bits constitute the data for one frame. In the case of the PCM data 12b, four samples each of 12 bits constitute the data for one frame. Accordingly, each sample of 16 bits is divided into four symbols, while the sample of 12 bits is divided into three symbols. The symbols $P_0$ and $P_1$ for the error detection and correction codes are prepared in the form of the Reed-Solomon code in accordance with the following expressions:

$$\left. \begin{array}{l} Iw_1 + Iw_2 + Iw_3 + \ldots + Iw_{12} + IP_1 + IP_2 = 0 \\ T^{13}w_1 + T^{12}w_2 + T^{11}w_3 + \ldots + T^2w_{12} + TP_1 + IP_2 = 0 \end{array} \right\} \quad (5)$$

where I represents an identity element, and T, $T^2$, $T^3$, ..., $T^{13}$ represent individual non-zero elements of Galois field ($2^4$). Further, multiplication and addition as indicated are operations defined by the Galois field.

In this way, according to the frame structures illustrated in FIGS. 16A and 16B, the number of the symbols contained in one frame is constant for both signals of different quantization bit numbers because each symbol is constituted by a number of bits equal to a common divisor of the different quantization bits, whereby the error detection and correction codes can be generated and decoded by using same arithmetic or operation circuits, respectively.

Figure 17A:
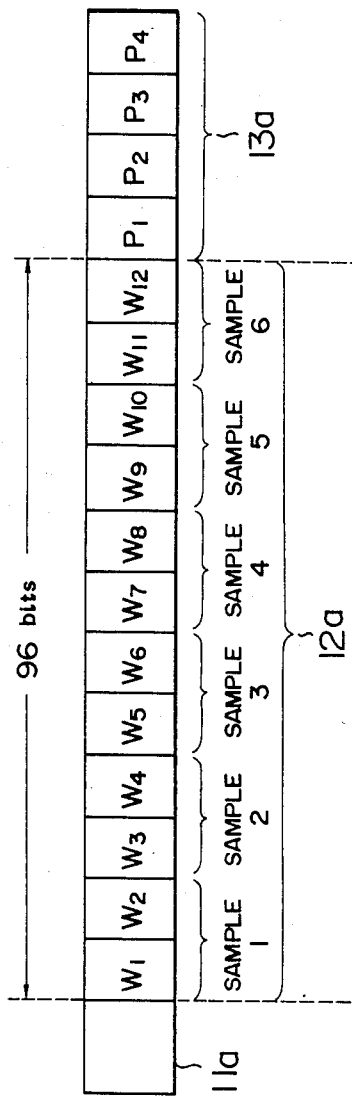
Figure 17B:
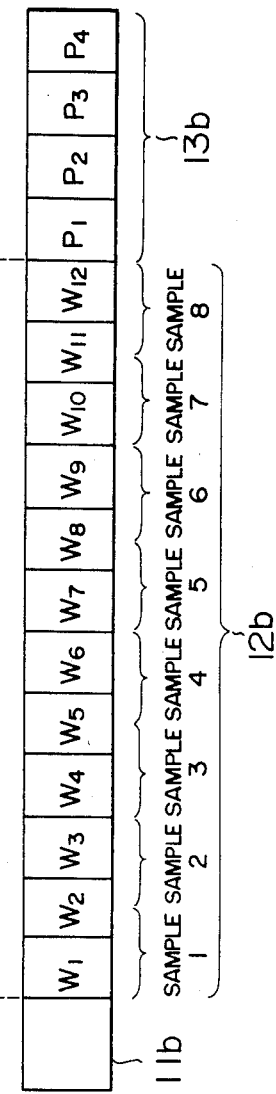

FIGS. 17A and 17B show frame structures for the PCM digital signals of quantization bit numbers of 16 and 12, respectively, in which each symbol is constituted by bits in number of eight which can divide the bit number of the PCM data contained in each frame without residue, and in which the error detection and correction codes of four symbols are created and added. More particularly, FIG. 17A shows a frame structure for the data signal sampled and quantized in 16 bits, while FIG. 17B shows a frame structure for the data signal sampled and quantized in 12 bits. The PCM data 12a includes six samples each of 16 bits, while the PCM data 12b includes eight samples each of 12 bits. For preparing the symbols each of eight bits for both PCM data 12a and 12b, each sample of 16 bits is divided into two symbols to thereby prepare the symbols $w_1$, $w_2$, ..., $w_{12}$ in the case of the PCM data 12a. On the other hand, in the case of the PCM data 12b, each sample of 12 bits is divided into one symbol of eight bits and four residual bits which are combined with residual bits resulting from the division of another sample, to thereby constitute one symbol. In this way, the symbols $w_1$, $w_2$, ..., $w_{12}$ are prepared. Symbols $P_1$, $P_2$, $P_3$ and $P_4$ of the error detection and correction codes are created in the form of the Reed-Solomon code in accordance with the following expression:

$$\left. \begin{array}{l} Iw_1 + Iw_2 + Iw_3 + \ldots + Iw_{12} + IP_1 + IP_2 + IP_3 + IP_4 = 0 \\ T^{15}w_1 + T^{14}w_2 + T^{13}w_3 + \ldots + T^4w_{12} + T^3P_1 + T^2P_2 + TP_3 + IP_4 = 0 \\ T^{30}w_1 + T^{28}w_2 + T^{26}w_3 + \ldots + T^8w_{12} + T^6P_1 + T^4P_2 + T^2P_3 + IP_4 = 0 \\ T^{45}w_1 + T^{42}w_2 + T^{39}w_3 + \ldots + T^{12}w_{12} + T^9P_1 + T^6P_2 + T^3P_3 + IP_4 = 0 \end{array} \right\} \quad (6)$$

where I represents an identity element, and T, $T^2$, $T^3$, ..., $T^{45}$ represent individual non-zero elements of Galois field ($2^8$). Further, multiplication and addition as indicated are operations defined by the Galois field.

Since the number of the symbols is same for both the PCM data 12a and 12b, it is possible to generate and decode the error detection and correction codes by using same arithmetic circuits independent of the quantization bit numbers. Further, according to the frame structure illustrated in FIGS. 17A and 17B, there are available an increased number of the individual non-zero elements T, $T^2$, $T^3$, ..., $T^{45}$, which means that the number of the symbols for the error detection and correction codes can be increased as compared with the frame structure shown in FIGS. 16A and 16B.

Figure 19A:
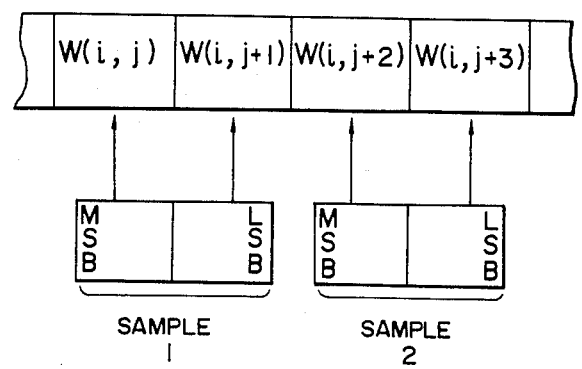
Figure 19B:
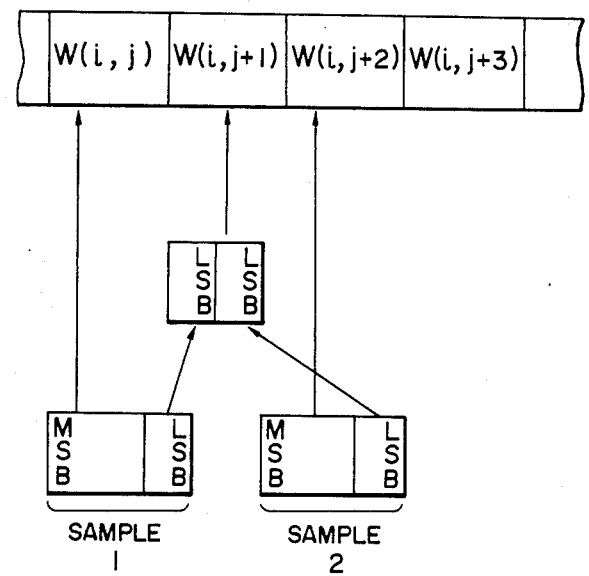

FIG. 18 shows a format for recording PCM data in twenty tracks on a magnetic tape. Referring to FIG. 18, a reference numeral 307 denotes the magnetic tape, and $t_1$ to $t_{20}$ denote tracks of data recorded on the magnetic tape. Reference symbols 11a1 to 11a20 denote the frame synchronizing signal patterns, and 13a1 to 13a20 denote error detection codes, respectively. Further, w(i, j)

designate data symbols each of eight bits, where i represents the identifying number in the trackwise or transverse direction and takes 1, 2, ..., or 16, and j represents the identifying number in the tape traveling or longitudinal direction and may assume 1, 2, ..., or 12. The symbols of the error correction codes are represented by $P_1(j)$, $P_2(j)$, $P_3(j)$ and $P_4(j)$, where j represents the identifying number in the tape traveling direction and may take a value of 1,2, ..., or 12. FIGS. 19A and 19B show data samples of 16 bits and 12 bits, respectively, in the state divided into the symbols. In the example illustrated in FIG. 19A, each sample of 16 bits is divided into two symbols one of which is constituted by the most significant eight bits while the other is constituted by the least significant eight bits. In the example illustrated in FIG. 19B, one sample of 12 bits is divided into the most significant eight bits for constituting one symbol, and the least significant four bits, the latter being combined with the least significant four bits of another sample to thereby constitute another symbol. By dividing the PCM data sample into symbols in this way, each of the tracks shown in FIG. 18 includes twelve symbols. Accordingly, the number of the samples is six for the PCM data quantized in 16 bits, while the number of the samples is eight for the PCM data quantized in 12 bits. In other words, PCM data contained in every frame is constituted by a same number of bits or the same number of symbols. The error detection code $13a1$ is created as the CRC code of 16 bits on the basis of the PCM data $w(1, j)$ (where $j=1, ..., 12$) of the same track. In other tracks $t_2$ to $t_{20}$, the error detection codes are created and added in the similar manner. Thus, the same procedures can be commonly employed for generating and decoding the error correction codes independent of different numbers of the quantization bits. Further, the error correction codes $P_1(j)$, $P_2(j)$, $P_3(j)$ and $P_4(j)$ (where $j=1, ..., 12$) can be prepared as the Reed-Solomon code on the basis of the individual symbols arrayed trackwise in accordance with the following expression:

$$\left. \begin{array}{l} Iw(1,j) + Iw(2,j) + \ldots + Iw(16,j) + IP_1(j) + IP_2(j) + IP_3(j) + IP_4(j) = 0 \\ T^{19}w(1,j) + T^{18}w(1,j) + \ldots + T^4w(16,j) + T^3P_1(j) + T^2P_2(j) + TP_3(j) + IP_4(j) = 0 \\ T^{38}w(1,j) + T^{36}w(1,j) + \ldots + T^8w(16,j) + T^6P_1(j) + T^4P_2(j) + T^2P_3(j) + IP_4(j) = 0 \\ T^{57}w(1,j) + T^{54}w(1,j) + \ldots + T^{12}w(16,j) + T^9P_1(j) + T^6P_2(j) + T^3P_3(j) + IP_4(j) = 0 \end{array} \right\} \quad (7)$$

where $j=1, 2, ..., 12$, I represents an identity element, and $T$, $T^2$, $T^3$, ..., $T^{57}$ represent individual non-zero elements of Galois field ($2^8$). Further, multiplication and addition as indicated are operations defined by the Galois field.

Thus, it is possible to generate and add the error correction codes through same procedures in common to both the PCM data independent of the difference in the quantization bit numbers thereof.

We claim:

1. A recording/reproducing apparatus in which an analogue signal is sampled at a selected sampling frequency, converted into a PCM signal by digitizing the samples in accordance with a predetermined quantization bit number, and recording said PCM signal on a moving recording medium and reproducing said PCM signal therefrom by means of a recording head, comprising:

means for generating a clock signal having a frequency which can be varied selectively in accordance with said selected sampling frequency and quantization bit number at which the analogue signal is converted to a PCM signal;

means for processing the digital signal to be recorded and reproduced by using said clock signal; and means for controlling the relative speed of the recording head and the recording medium in dependence on said selected sampling frequency and said predetermined quantization bit number.

2. A recording/reproducing apparatus according to claim 1, wherein said relative speed controlling means includes means for varying the rotation speed of a rotating head assembly and the traveling speed of the recording medium in accordance with the changing of said sampling frequency and said quantization bit number.

3. A recording/reproducing apparatus according to claim 1, wherein said relative speed controlling means includes means for varying the traveling speed of said recording medium in accordance with the changing of said sampling frequency and said quantization bit number.

4. A recording/reproducing apparatus according to claim 1, wherein said digital signal processing means includes means for preparing a frame of the digital signal to be recorded and reproduced from a number of bits which is a common multiple of the bit numbers of the PCM signals whose quantization bit numbers are different from each other.

5. A recording/reproducing apparatus according to claim 4, wherein said processing means includes means for adding the same type of error detection and correction codes for the PCM signals to be recorded whose quantization bit numbers differ from each other.

6. A recording/reproducing apparatus according to claim 1, wherein two types of PCM signals whose samples are quantized in different bit numbers $n_{s1}$ and $n_{s2}$, respectively, are present, and wherein:

said digital signal processing means includes means for dividing the PCM signal sampled and quantized in $n_{s1}$ bits by $m_{s1}$ while dividing the PCM data sampled and quantized in $n_{s2}$ bits by $m_{s2}$, constituting frames with numbers of samples which satisfy the condition of $n_{s1} \times m_{s1} = n_{s2} \times m_{s2}$, and adding to each frame a frame synchronising signal and error detection and correction codes common to said two types of the PCM signals.

7. A digital signal recording/reproducing apparatus in which an analogue audio signal is sampled at a selected sampling frequency and converted to a digital signal to be recorded by digitizing the samples in accordance with a predetermined quantization bit number and which is capable of performing recording and reproduction of digital signals with a high efficiency even when said digital signals are different in respect to sampling frequence and quantization bit number, comprising:

signal processing means for processing said digital signal converted from the analogue signal so as to be suitable for the recording in such a manner that PCM data contained in a data frame is constituted by a number of bits equal to a common multiple of said different quantization bit nubers and to which is added the same type of error detection and correction codes to thereby realize a data frame structure common to said different digital signals independent of said difference in the quantization bit number;

recording means including recording head assembly for recording the output of said signal processing means on a moving recording medium;

means for varying the relative speed of said recording head assembly and said recording medium in dependence on the sampling frequency and the quantization bit number of said digital signal; and clock signal generating means for generating a clock signal the frequency of which is changed in accordance with said sampling frequency and said quantization bit number, said clock signal being supplied to said signal processing means.

8. A digital signal recording/reproducing apparatus as set forth in claim 7, wherein said recording means includes a rotating head assembly, and wherein said relative speed varying means includes means for varying the revolution speed of said rotating head assembly in dependence on said sampling frequency and said quantization bit number.

9. A digital signal recording/reproducing apparatus as set forth in claim 7, wherein said recording means includes a plurality of stationary heads for forming simultaneously a plurality of tracks on the recording medium, and wherein said relative speed varying means includes means for varying traveling speed of said recording medium in dependence on the sampling frequency and said quantization bit number.

10. A digital signal recording/reproducing apparatus as set forth in claim 8, wherein said relative speed varying means further includes means for varying the traveling speed of said recording medium in dependence on the sampling frequency and said quantization bit number.

* * * * *